(12) United States Patent
Kubo

(10) Patent No.: US 7,096,312 B2
(45) Date of Patent: Aug. 22, 2006

(54) DATA TRANSFER DEVICE AND METHOD FOR MULTIDIMENSIONAL MEMORY

(75) Inventor: Toshihiro Kubo, Saitama (JP)

(73) Assignee: Seiko Epson Corporation, Tokyo (JP)

( * ) Notice: Subject to any disclaimer, the term of this patent is extended or adjusted under 35 U.S.C. 154(b) by 265 days.

(21) Appl. No.: 10/386,473

(22) Filed: Mar. 13, 2003

(65) Prior Publication Data

US 2003/0233511 A1 Dec. 18, 2003

(30) Foreign Application Priority Data

Mar. 20, 2002 (JP) .............................. 2002-079523

(51) Int. Cl.
  *G06F 12/00* (2006.01)
(52) U.S. Cl. ......................... 711/100; 382/285; 382/295
(58) Field of Classification Search ................ 711/170, 711/100, 209, 217; 382/285, 295
See application file for complete search history.

(56) References Cited

U.S. PATENT DOCUMENTS

| | | | | |
|---|---|---|---|---|
| 5,046,023 | A | * | 9/1991 | Katsura et al. ............. 345/619 |
| 5,047,958 | A | | 9/1991 | Comins et al. |
| 5,566,341 | A | * | 10/1996 | Roberson et al. ............. 712/15 |
| 5,603,009 | A | * | 2/1997 | Konishi et al. ............. 711/165 |
| 5,613,146 | A | * | 3/1997 | Gove et al. .................... 712/20 |
| 5,666,521 | A | * | 9/1997 | Marisetty .................... 345/562 |
| 5,671,401 | A | * | 9/1997 | Harrell ........................ 345/505 |
| 5,745,785 | A | * | 4/1998 | Shoji et al. ..................... 710/7 |
| 5,757,381 | A | * | 5/1998 | Shoji et al. .................. 345/684 |
| 5,844,856 | A | * | 12/1998 | Taylor .................... 365/230.05 |
| 6,026,466 | A | * | 2/2000 | Su et al. ...................... 711/105 |
| 6,094,397 | A | * | 7/2000 | Hadderman et al. ... 365/230.03 |
| 6,189,064 | B1 | * | 2/2001 | MacInnis et al. ........... 710/244 |
| 6,366,524 | B1 | * | 4/2002 | Abedifard .............. 365/230.06 |
| 6,529,429 | B1 | * | 3/2003 | Cowles et al. .............. 365/201 |
| 6,941,443 | B1 | * | 9/2005 | Isomura et al. ............. 711/209 |
| 2001/0043206 | A1 | * | 11/2001 | Naito et al. ................. 345/204 |

FOREIGN PATENT DOCUMENTS

| | | |
|---|---|---|
| JP | A 62-205452 | 9/1987 |
| JP | A 62-297951 | 12/1987 |
| JP | A-2-126364 | 5/1990 |
| JP | A 04-065777 | 3/1992 |
| JP | A 04-153846 | 5/1992 |
| JP | A-4-167191 | 6/1992 |

(Continued)

OTHER PUBLICATIONS

Goto et al., Atsuhiro, Hardware of Multi-Module Construction Associative Processor, Dream-II, Faculty of Engineering, University of Tokyo, p. 41-50 with English Translation.

(Continued)

*Primary Examiner*—Pierre Bataille
*Assistant Examiner*—Sheng-Jen Tsai
(74) *Attorney, Agent, or Firm*—Oliff & Berridge, PLC

(57) ABSTRACT

The invention provides a data transfer device for multidimensional memory capable of performing an efficient SIMD operation and suitable for transferring data between a multidimensional memory and a one-dimensional memory. A DMAC reads data of a rectangular area in a logical two-dimensional space of a two-dimensional data access memory, and writes the read data on a one-dimensional data access memory. Further, it reads data from the one-dimensional data access memory, and writes the read data on the two-dimensional data access memory, such that the data are arranged in the rectangular area in the logical two-dimensional space of the two-dimensional data access memory.

2 Claims, 19 Drawing Sheets

FOREIGN PATENT DOCUMENTS

| | | |
|---|---|---|
| JP | A 04-333952 | 11/1992 |
| JP | A-5-81170 | 4/1993 |
| JP | A 11-283020 | 10/1999 |
| JP | A-2000-69478 | 3/2000 |
| JP | A 2000-079723 | 3/2000 |
| JP | A-2000-355945 | 12/2000 |
| JP | A-2001-243112 | 9/2001 |
| WO | WO00/43868 | 7/2000 |

OTHER PUBLICATIONS

Motooka et al., Associative Processing System Using Two-Dimensional Access Memory, Faculty of Engineering, University of Tokyo, p. 85-94 with English Translation.

Tohru Moto-Oka et al., The Structure and Functions of Associative Processor, Faculty of Engineering, University of Tokyo p. 67-78 with English Translation.

* cited by examiner

[FIG. 1]

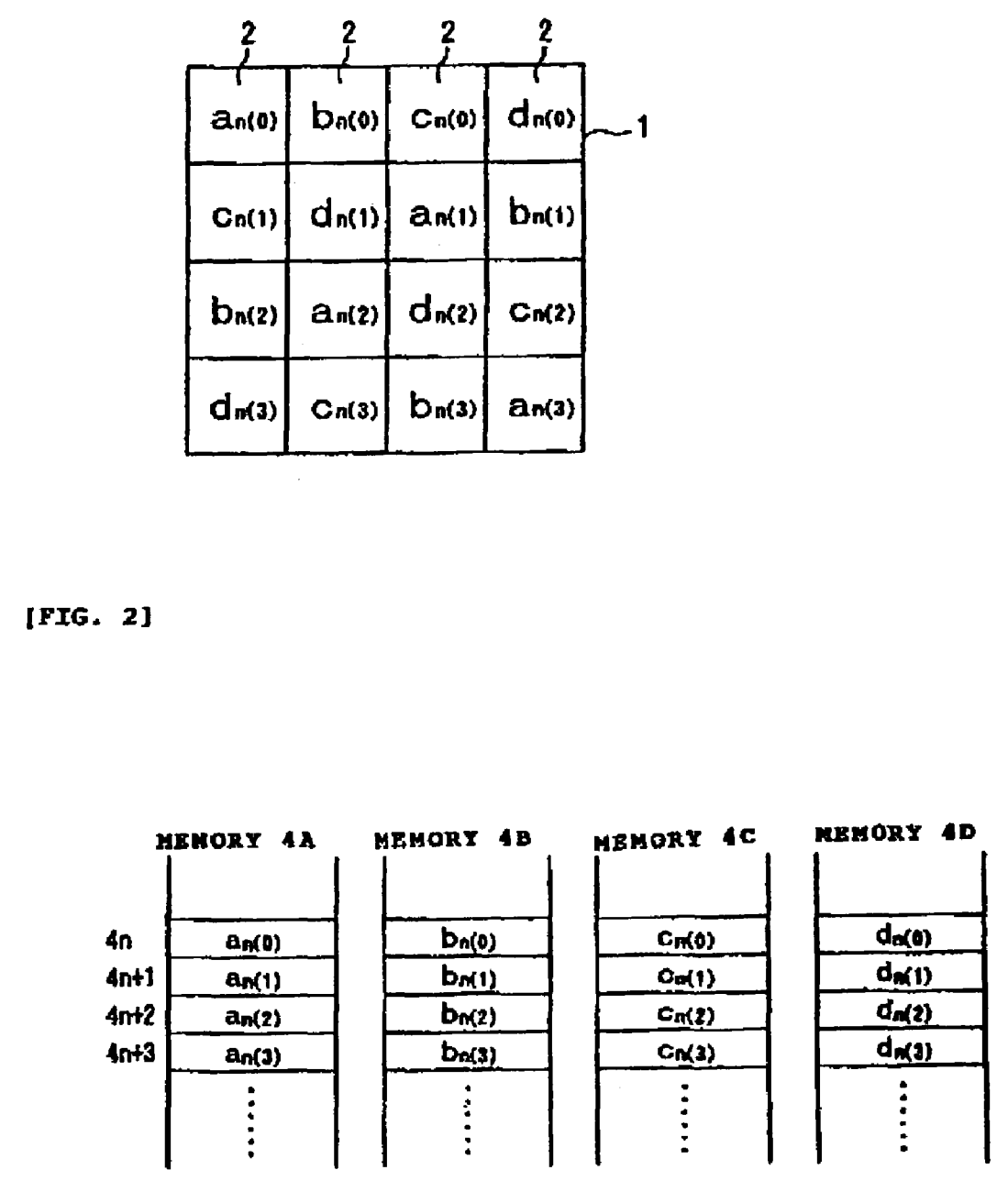

| $a_n(0)$ | $b_n(0)$ | $c_n(0)$ | $d_n(0)$ |
|---|---|---|---|
| $c_n(1)$ | $d_n(1)$ | $a_n(1)$ | $b_n(1)$ |
| $b_n(2)$ | $a_n(2)$ | $d_n(2)$ | $c_n(2)$ |
| $d_n(3)$ | $c_n(3)$ | $b_n(3)$ | $a_n(3)$ |

[FIG. 2]

|  | MEMORY 4A | MEMORY 4B | MEMORY 4C | MEMORY 4D |
|---|---|---|---|---|
| $4n$ | $a_n(0)$ | $b_n(0)$ | $c_n(0)$ | $d_n(0)$ |
| $4n+1$ | $a_n(1)$ | $b_n(1)$ | $c_n(1)$ | $d_n(1)$ |
| $4n+2$ | $a_n(2)$ | $b_n(2)$ | $c_n(2)$ | $d_n(2)$ |
| $4n+3$ | $a_n(3)$ | $b_n(3)$ | $c_n(3)$ | $d_n(3)$ |

[FIG. 3]
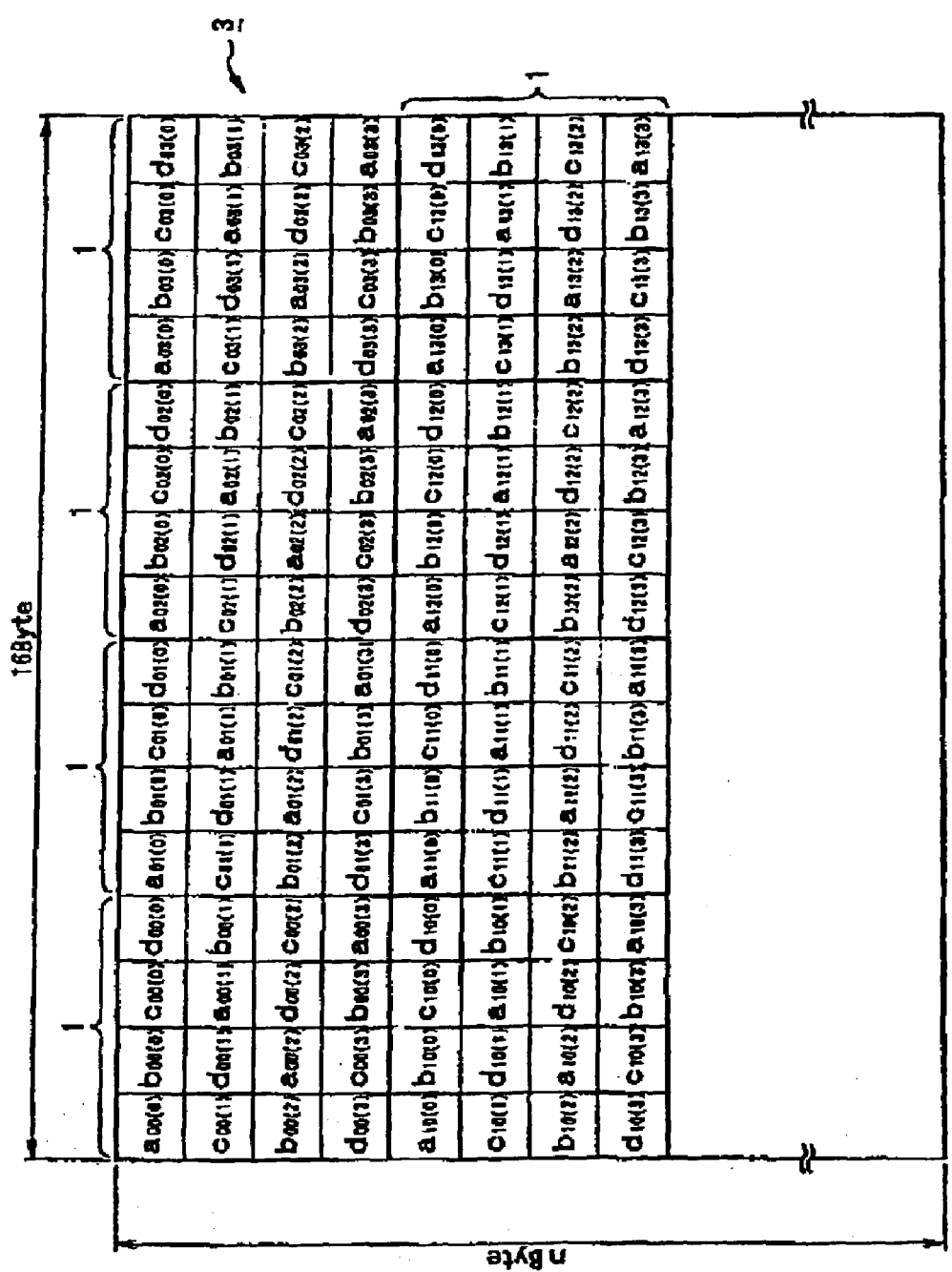

[FIG. 4]
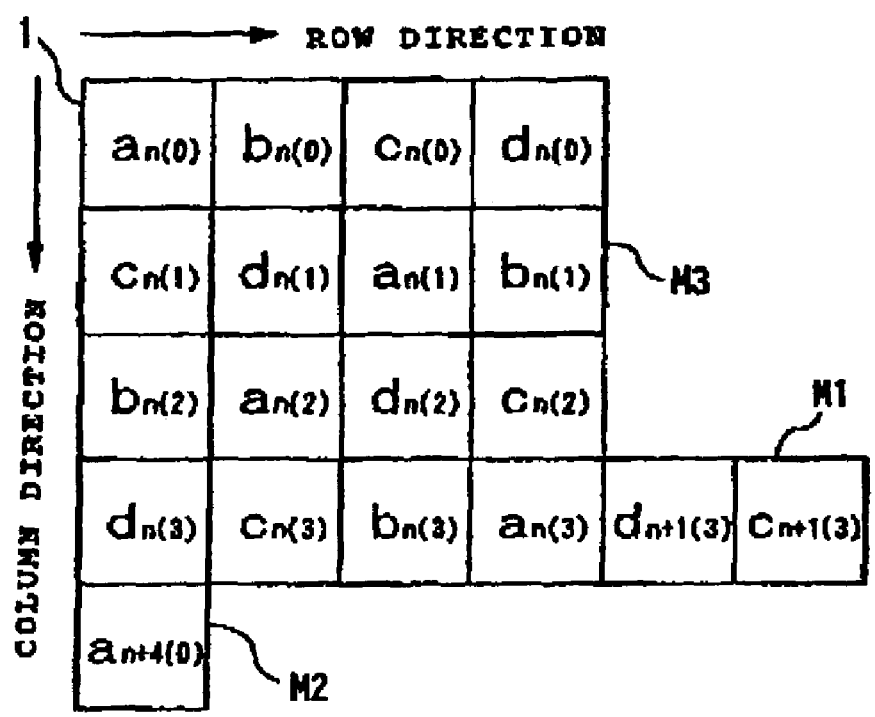

[FIG. 5]
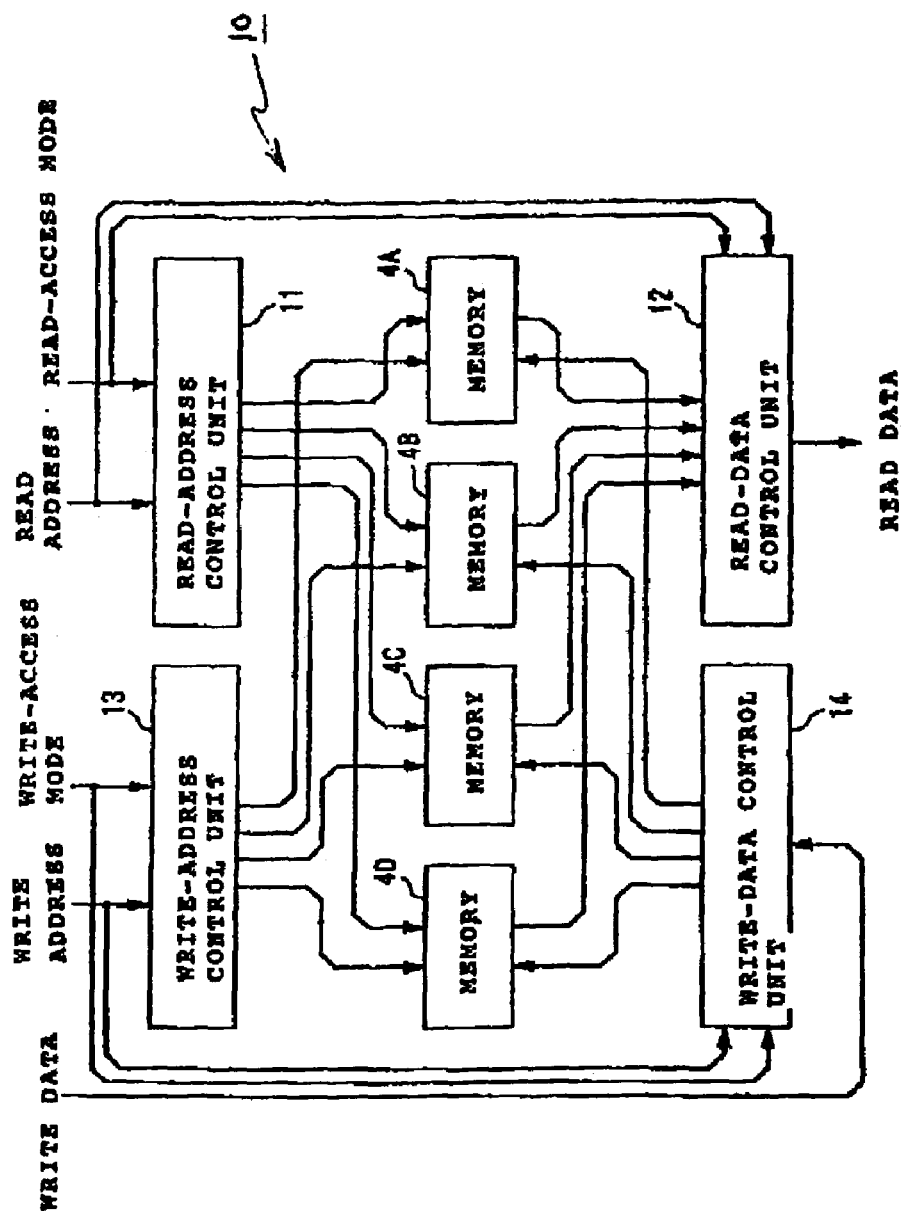

[FIG. 6]
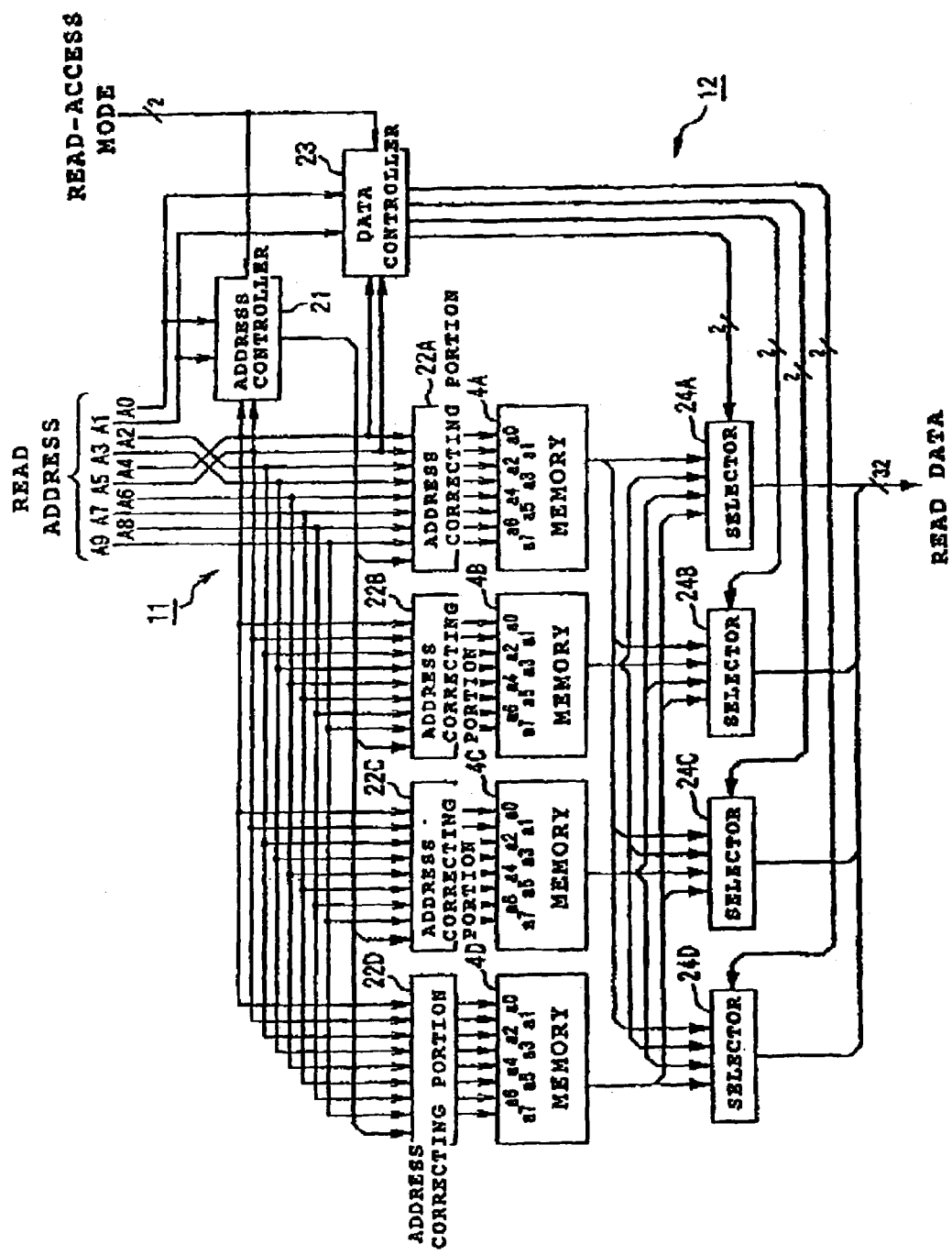

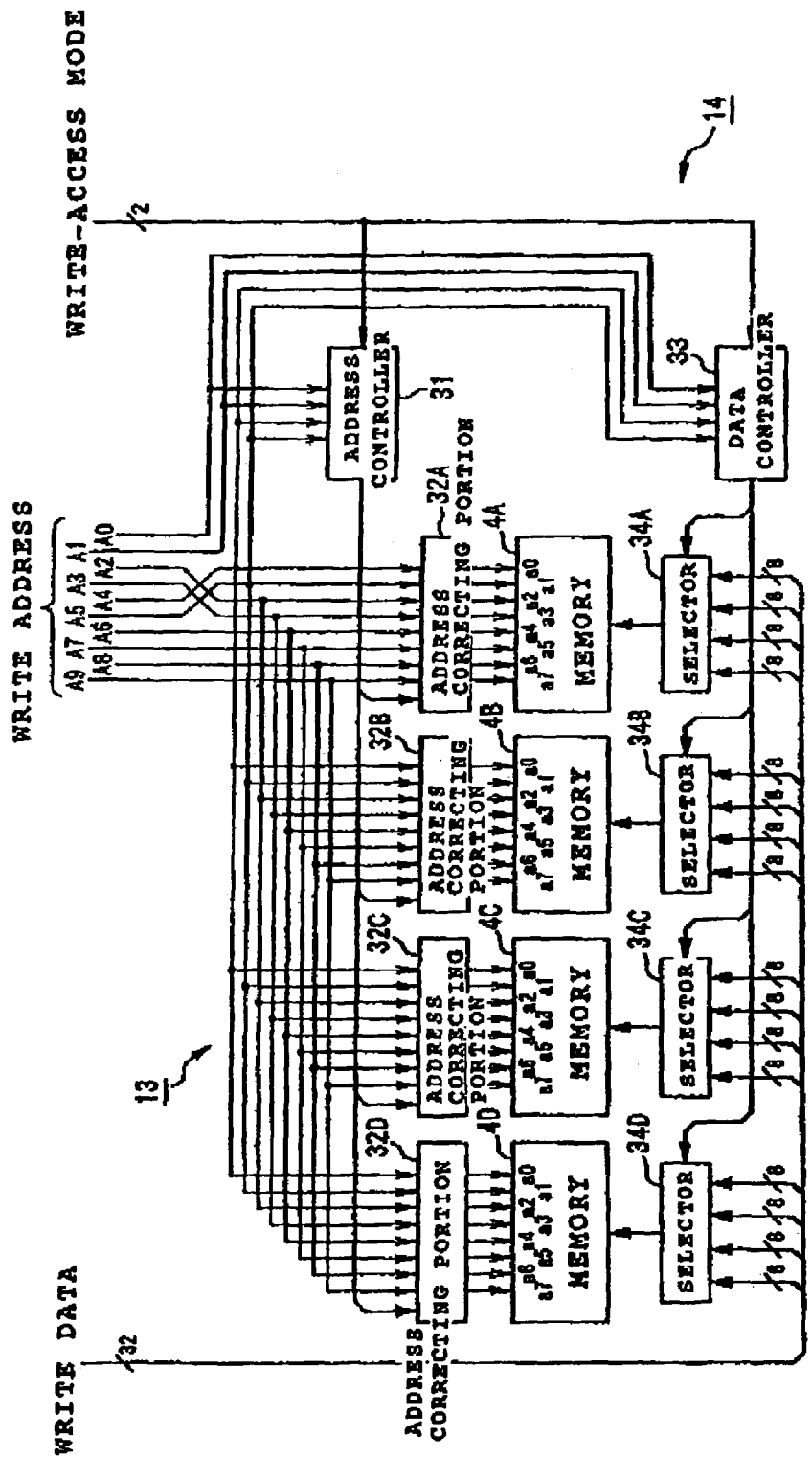
[FIG. 7]

[FIG. 8]

| No. | READ-ACCESS MODE | READ ADDRESS |  |  |  | SELECTOR 24A | SELECTOR 24B | SELECTOR 24C | SELECTOR 24D |
|---|---|---|---|---|---|---|---|---|---|
|  |  | A0 | A1 | A4 | A5 |  |  |  |  |
| 1 | ROW-DIRECTION ACCESS MODE (00) | 0 | 0 | 0 | 0 | 4A | 4B | 4C | 4D |
| 2 |  | 1 | 0 | 0 | 0 | 4B | 4C | 4D | 4A |
| 3 |  | 0 | 1 | 0 | 0 | 4C | 4D | 4A | 4B |
| 4 |  | 1 | 1 | 0 | 0 | 4D | 4A | 4D | 4C |
| 5 |  | 0 | 0 | 1 | 0 | 4C | 4D | 4A | 4B |
| 6 |  | 1 | 0 | 1 | 0 | 4D | 4A | 4B | 4C |
| 7 |  | 0 | 1 | 1 | 0 | 4A | 4B | 4C | 4D |
| 8 |  | 1 | 1 | 1 | 0 | 4B | 4C | 4D | 4A |
| 9 |  | 0 | 0 | 0 | 1 | 4B | 4A | 4D | 4C |
| 10 |  | 1 | 0 | 0 | 1 | 4A | 4D | 4C | 4B |
| 11 |  | 0 | 1 | 0 | 1 | 4D | 4C | 4B | 4A |
| 12 |  | 1 | 1 | 0 | 1 | 4C | 4B | 4A | 4D |
| 13 |  | 0 | 0 | 1 | 1 | 4D | 4C | 4B | 4A |
| 14 |  | 1 | 0 | 1 | 1 | 4C | 4B | 4A | 4D |
| 15 |  | 0 | 1 | 1 | 1 | 4B | 4A | 4D | 4C |
| 16 |  | 1 | 1 | 1 | 1 | 4A | 4D | 4C | 4B |
| 17 | COLUMN-DIRECTION ACCESS MODE (01) | 0 | 0 | 0 | 0 | 4A | 4C | 4B | 4D |
| 18 |  | 1 | 0 | 0 | 0 | 4B | 4D | 4A | 4C |
| 19 |  | 0 | 1 | 0 | 0 | 4C | 4A | 4D | 4B |
| 20 |  | 1 | 1 | 0 | 0 | 4D | 4B | 4C | 4A |
| 21 |  | 0 | 0 | 1 | 0 | 4C | 4B | 4D | 4A |
| 22 |  | 1 | 0 | 1 | 0 | 4D | 4A | 4C | 4D |
| 23 |  | 0 | 1 | 1 | 0 | 4A | 4D | 4B | 4C |
| 24 |  | 1 | 1 | 1 | 0 | 4B | 4C | 4A | 4D |
| 25 |  | 0 | 0 | 0 | 1 | 4B | 4D | 4A | 4C |
| 26 |  | 1 | 0 | 0 | 1 | 4A | 4C | 4B | 4D |
| 27 |  | 0 | 1 | 0 | 1 | 4D | 4B | 4A | 4C |
| 28 |  | 1 | 1 | 0 | 1 | 4C | 4A | 4D | 4B |
| 29 |  | 0 | 0 | 1 | 1 | 4D | 4A | 4C | 4B |
| 30 |  | 1 | 0 | 1 | 1 | 4C | 4B | 4D | 4A |
| 31 |  | 0 | 1 | 1 | 1 | 4B | 4C | 4A | 4D |
| 32 |  | 1 | 1 | 1 | 1 | 4A | 4D | 4B | 4C |
| 33 | COLUMN-DIRECTION TWO STEP ACCESS MODE 16bit×2 (10) | 0 | 0 | 0 | 0 | 4A | 4B | 4C | 4D |
| 34 |  | 0 | 1 | 0 | 0 | 4C | 4D | 4A | 4B |
| 35 |  | 0 | 0 | 1 | 0 | 4C | 4D | 4B | 4A |
| 36 |  | 0 | 1 | 1 | 0 | 4A | 4B | 4D | 4C |
| 37 |  | 0 | 0 | 0 | 1 | 4B | 4A | 4D | 4C |
| 38 |  | 0 | 1 | 0 | 1 | 4D | 4C | 4B | 4A |
| 39 |  | 0 | 0 | 1 | 1 | 4D | 4C | 4A | 4B |
| 40 |  | 0 | 1 | 1 | 1 | 4B | 4A | 4C | 4D |

[FIG. 9]

| READ-ACCESS MODE | READ ADDRESS | | | | MEMORY 4A | | MEMORY 4B | | MEMORY 4C | | MEMORY 4D | |
|---|---|---|---|---|---|---|---|---|---|---|---|---|
| | A0 | A1 | A4 | A5 | a0 | a1 | a0 | a1 | a0 | a1 | a0 | a1 |
| ROW-DIRECTION ACCESS MODE | — | — | 0 | 0 | 0 | 0 | 0 | 0 | 0 | 0 | 0 | 0 |
| | — | — | 1 | 0 | 1 | 0 | 1 | 0 | 1 | 0 | 1 | 0 |
| | — | — | 0 | 1 | 0 | 1 | 0 | 1 | 0 | 1 | 0 | 1 |
| | — | — | 1 | 1 | 1 | 1 | 1 | 1 | 1 | 1 | 1 | 1 |
| COLUMN-DIRECTION ACCESS MODE | 0 | 0 | — | — | 0 | 0 | 0 | 1 | 1 | 0 | 1 | 1 |
| | 1 | 0 | — | — | 0 | 1 | 0 | 0 | 1 | 1 | 1 | 0 |
| | 0 | 1 | — | — | 1 | 0 | 1 | 1 | 0 | 0 | 0 | 1 |
| | 1 | 1 | — | — | 1 | 1 | 1 | 0 | 0 | 1 | 1 | 1 |
| COLUMN-DIRECTION TWO STEP ACCESS MODE (16bit×2) | 0 | 0 | 0 | 0 | 0 | 0 | 0 | 0 | 1 | 0 | 1 | 0 |
| | 0 | 0 | 1 | 0 | 0 | 1 | 0 | 1 | 1 | 0 | 1 | 0 |
| | 0 | 0 | 0 | 1 | 0 | 1 | 0 | 1 | 1 | 1 | 1 | 1 |
| | 0 | 0 | 1 | 1 | 0 | 0 | 0 | 0 | 1 | 1 | 1 | 1 |
| | 0 | 1 | 0 | 0 | 1 | 0 | 1 | 0 | 0 | 0 | 0 | 0 |
| | 0 | 1 | 1 | 0 | 1 | 0 | 1 | 0 | 0 | 1 | 0 | 1 |
| | 0 | 1 | 0 | 1 | 1 | 1 | 1 | 1 | 0 | 1 | 0 | 1 |
| | 0 | 1 | 1 | 1 | 1 | 1 | 1 | 1 | 0 | 0 | 0 | 0 |

[FIG. 10]

| No | READ-ACCESS MODE | READ ADDRESS | | | | ADDRESS CORRECTING PORTION 22A | ADDRESS CORRECTING PORTION 22B | ADDRESS CORRECTING PORTION 22C | ADDRESS CORRECTING PORTION 22D |
|---|---|---|---|---|---|---|---|---|---|
| | | A0 | A1 | A4 | A5 | | | | |
| 1 | ROW-DIRECTION ACCESS MODE (00) | 0 | 0 | 0 | 0 | 0 | 0 | 0 | 0 |
| 2 | | 1 | 0 | 0 | 0 | +1 | 0 | 0 | 0 |
| 3 | | 0 | 1 | 0 | 0 | +1 | +1 | 0 | 0 |
| 4 | | 1 | 1 | 0 | 0 | +1 | +1 | +1 | 0 |
| 5 | | 0 | 0 | 1 | 0 | 0 | 0 | 0 | 0 |
| 6 | | 1 | 0 | 1 | 0 | 0 | 0 | +1 | 0 |
| 7 | | 0 | 1 | 1 | 0 | 0 | 0 | +1 | +1 |
| 8 | | 1 | 1 | 1 | 0 | +1 | 0 | +1 | +1 |
| 9 | | 0 | 0 | 0 | 1 | 0 | 0 | 0 | 0 |
| 10 | | 1 | 0 | 0 | 1 | 0 | +1 | 0 | 0 |
| 11 | | 0 | 1 | 0 | 1 | +1 | +1 | 0 | 0 |
| 12 | | 1 | 1 | 0 | 1 | +1 | +1 | 0 | +1 |
| 13 | | 0 | 0 | 1 | 1 | 0 | 0 | 0 | 0 |
| 14 | | 1 | 0 | 1 | 1 | 0 | 0 | 0 | +1 |
| 15 | | 0 | 1 | 1 | 1 | 0 | 0 | +1 | +1 |
| 16 | | 1 | 1 | 1 | 1 | 0 | +1 | +1 | +1 |
| 17 | COLUMN-DIRECTION ACCESS MODE (01) | 0 | 0 | 0 | 0 | 0 | 0 | 0 | 0 |
| 18 | | 1 | 0 | 0 | 0 | 0 | 0 | 0 | 0 |
| 19 | | 0 | 1 | 0 | 0 | 0 | 0 | 0 | 0 |
| 20 | | 1 | 1 | 0 | 0 | 0 | 0 | 0 | 0 |
| 21 | | 0 | 0 | 1 | 0 | +4 | 0 | 0 | 0 |
| 22 | | 1 | 0 | 1 | 0 | 0 | +4 | 0 | 0 |
| 23 | | 0 | 1 | 1 | 0 | 0 | 0 | +4 | 0 |
| 24 | | 1 | 1 | 1 | 0 | 0 | 0 | 0 | +4 |
| 25 | | 0 | 0 | 0 | 1 | +4 | 0 | +4 | 0 |
| 26 | | 1 | 0 | 0 | 1 | 0 | +4 | 0 | +4 |
| 27 | | 0 | 1 | 0 | 1 | +4 | 0 | +4 | 0 |
| 28 | | 1 | 1 | 0 | 1 | 0 | +4 | 0 | +4 |
| 29 | | 0 | 0 | 1 | 1 | +4 | +4 | +4 | 0 |
| 30 | | 1 | 0 | 1 | 1 | +4 | +4 | 0 | +4 |
| 31 | | 0 | 1 | 1 | 1 | +4 | 0 | +4 | +4 |
| 32 | | 1 | 1 | 1 | 1 | 0 | +4 | +4 | +4 |
| 33 | COLUMN-DIRECTION TWO STEP ACCESS MODE 16bit×2 (10) | 0 | 0 | 0 | 0 | 0 | 0 | 0 | 0 |
| 34 | | 0 | 1 | 0 | 0 | 0 | 0 | 0 | 0 |
| 35 | | 0 | 0 | 1 | 0 | 0 | 0 | 0 | 0 |
| 36 | | 0 | 1 | 1 | 0 | 0 | 0 | 0 | 0 |
| 37 | | 0 | 0 | 0 | 1 | 0 | 0 | 0 | 0 |
| 38 | | 0 | 1 | 0 | 1 | 0 | 0 | 0 | 0 |
| 39 | | 0 | 0 | 1 | 1 | +4 | +4 | 0 | 0 |
| 40 | | 0 | 1 | 1 | 1 | 0 | 0 | +4 | +4 |

[FIG. 11]
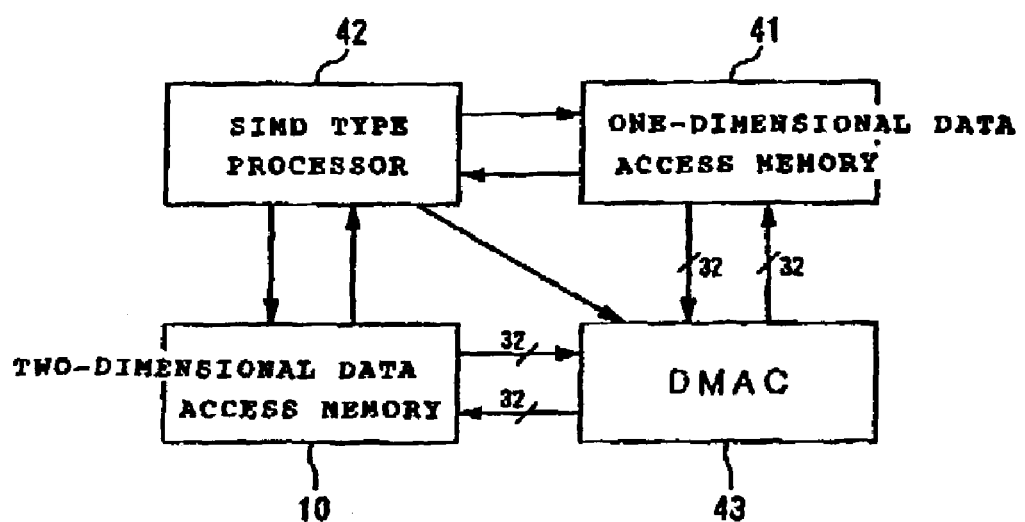

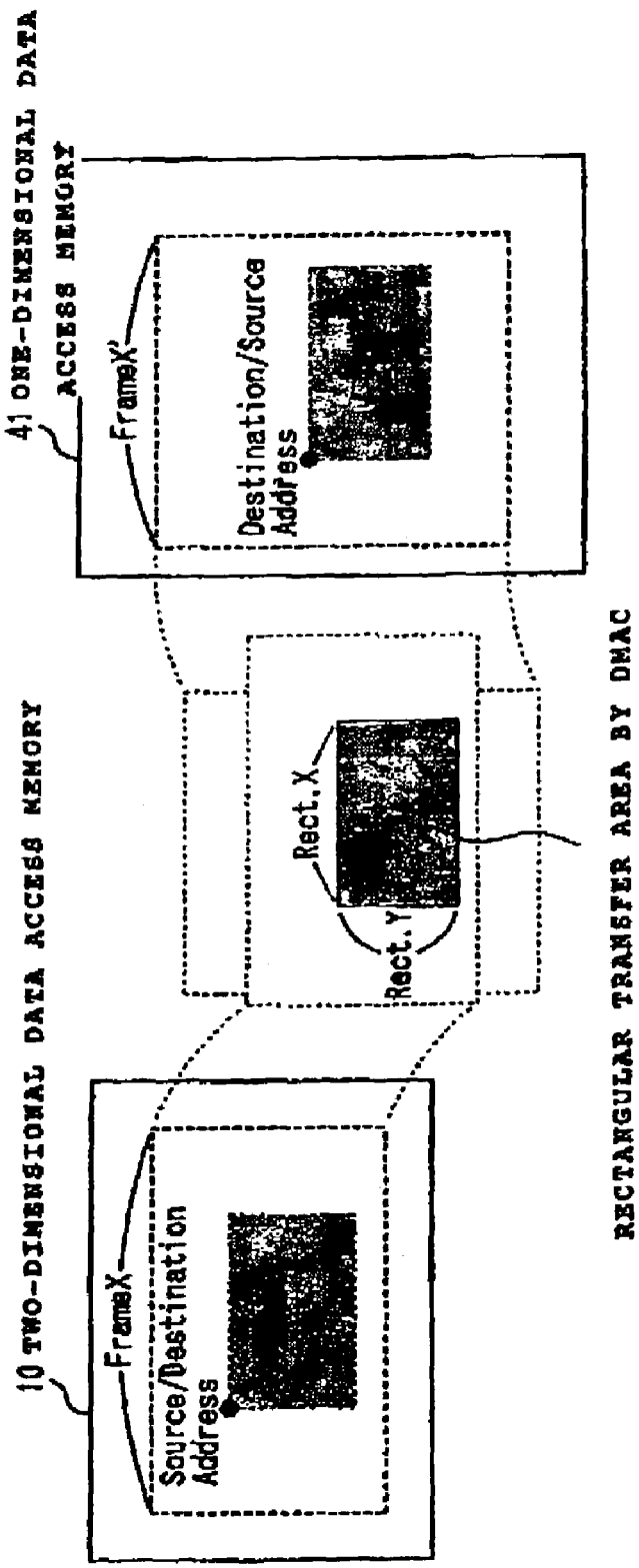
[FIG. 12]

[FIG. 13]
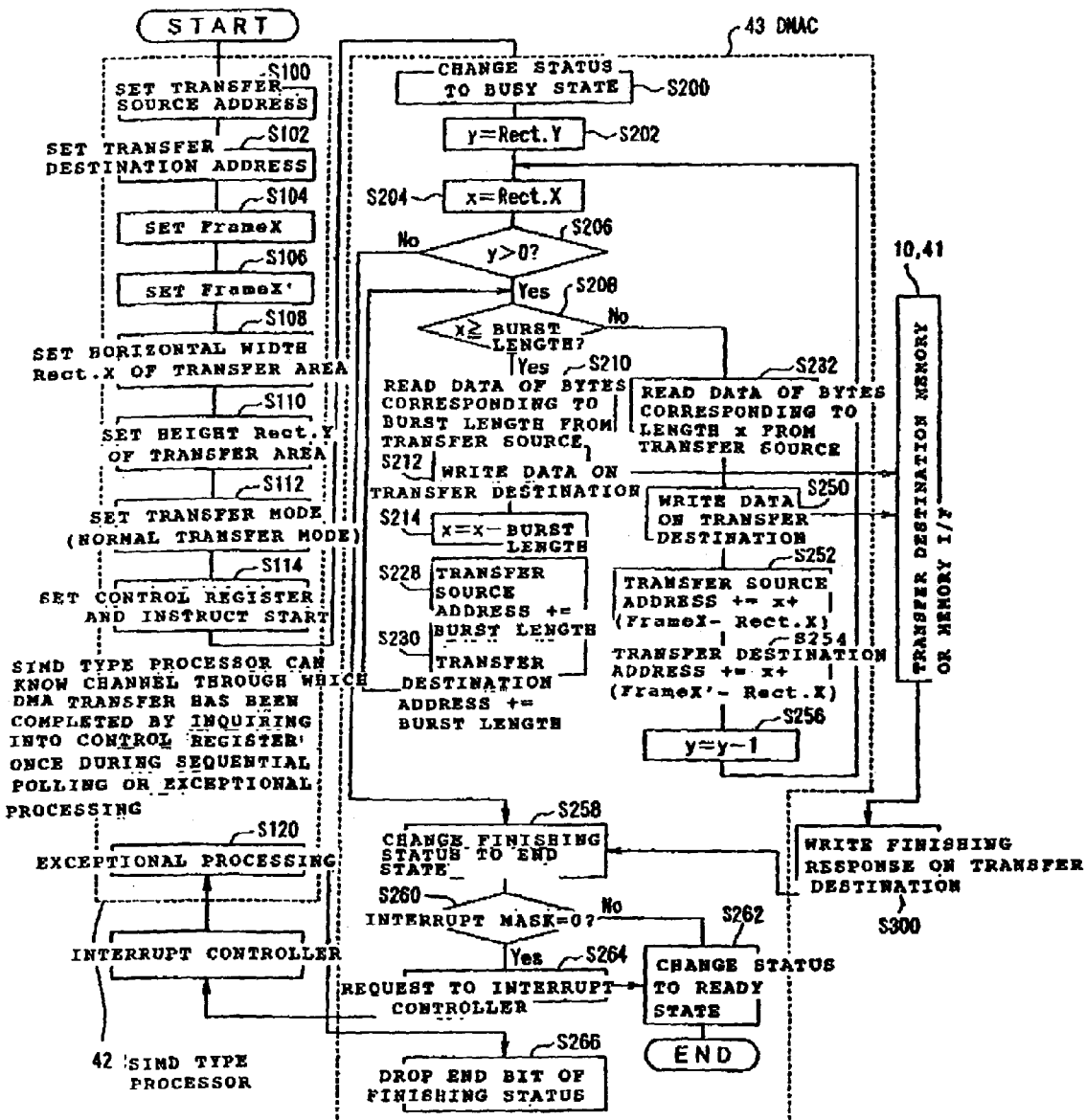

[FIG. 14]
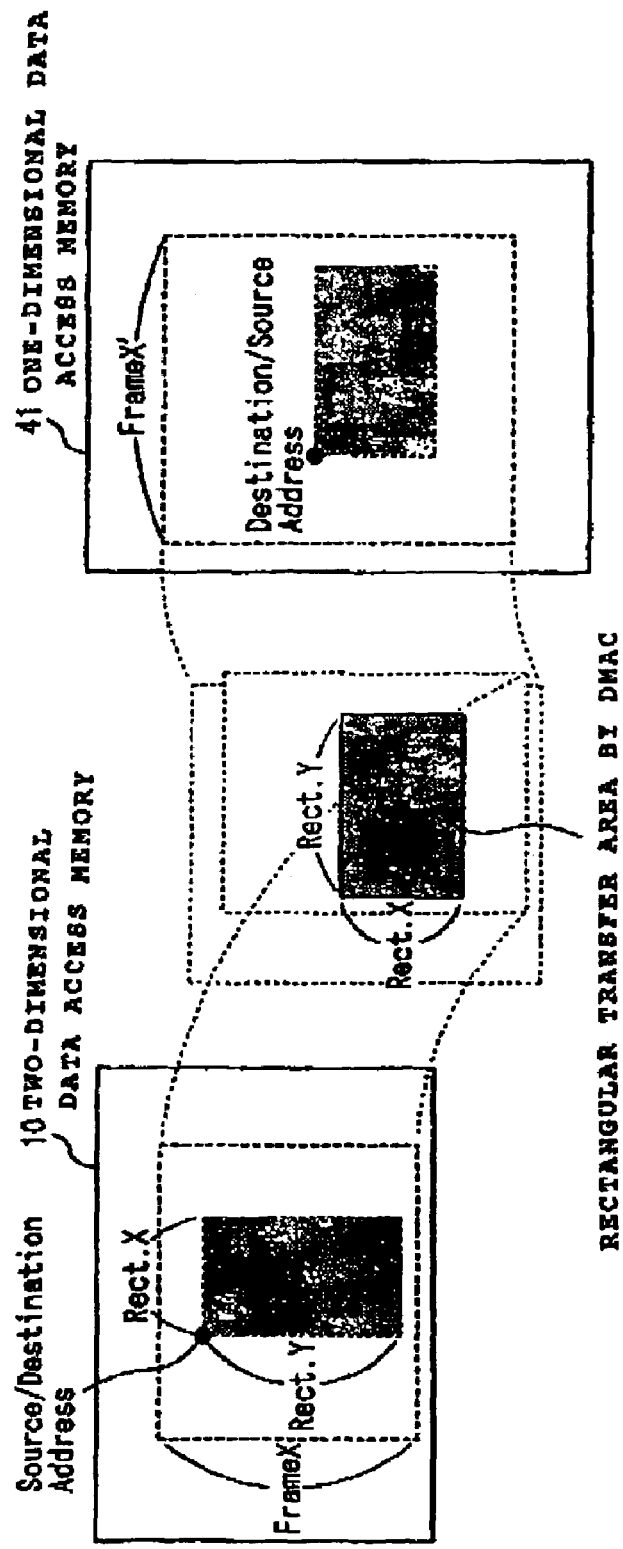

[FIG. 15]
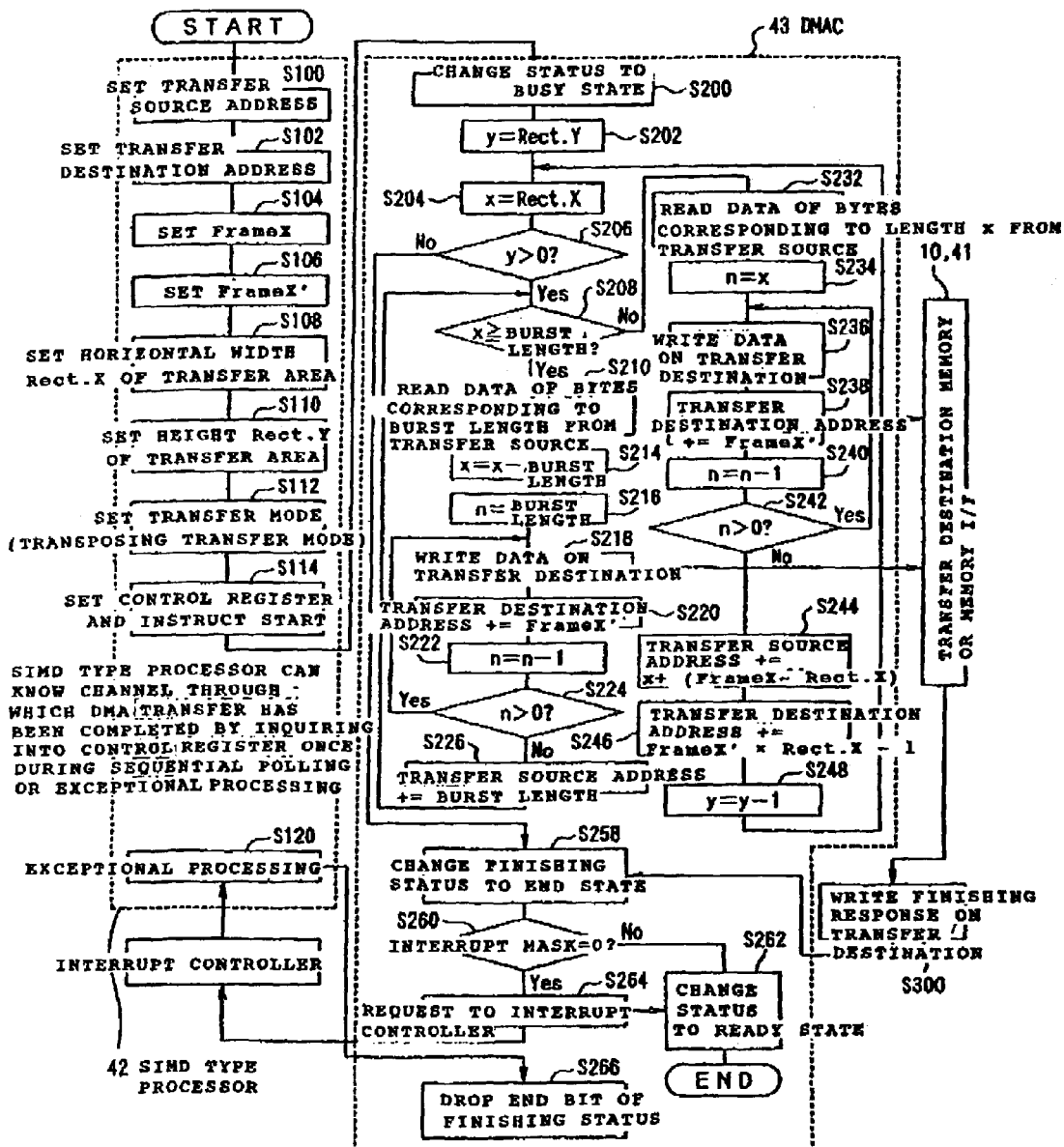

[FIG. 16]

ROW DIRECTION →

↓ COLUMN DIRECTION

| $x_{00}$ | $x_{01}$ | $x_{02}$ | $x_{03}$ | $x_{04}$ | $x_{05}$ | $x_{06}$ | $x_{07}$ |
| $x_{11}$ | $x_{11}$ | $x_{12}$ | $x_{13}$ | $x_{14}$ | $x_{15}$ | $x_{16}$ | $x_{17}$ |
| $x_{22}$ | $x_{21}$ | $x_{22}$ | $x_{23}$ | $x_{24}$ | $x_{25}$ | $x_{26}$ | $x_{27}$ |
| $x_{33}$ | $x_{31}$ | $x_{32}$ | $x_{33}$ | $x_{34}$ | $x_{35}$ | $x_{36}$ | $x_{37}$ |
| $x_{44}$ | $x_{41}$ | $x_{42}$ | $x_{43}$ | $x_{44}$ | $x_{45}$ | $x_{46}$ | $x_{47}$ |
| $x_{55}$ | $x_{51}$ | $x_{52}$ | $x_{53}$ | $x_{54}$ | $x_{55}$ | $x_{56}$ | $x_{57}$ |
| $x_{66}$ | $x_{61}$ | $x_{62}$ | $x_{63}$ | $x_{64}$ | $x_{65}$ | $x_{66}$ | $x_{67}$ |
| $x_{77}$ | $x_{71}$ | $x_{72}$ | $x_{73}$ | $x_{74}$ | $x_{75}$ | $x_{76}$ | $x_{77}$ |

[FIG. 17]

ROW DIRECTION →

↓ COLUMN DIRECTION

| $y'_{00}$ | $y'_{01}$ | $y'_{02}$ | $y'_{03}$ | $y'_{04}$ | $y'_{05}$ | $y'_{06}$ | $y'_{07}$ |
| $y'_{11}$ | $y'_{11}$ | $y'_{12}$ | $y'_{13}$ | $y'_{14}$ | $y'_{15}$ | $y'_{16}$ | $y'_{17}$ |
| $y'_{22}$ | $y'_{21}$ | $y'_{22}$ | $y'_{23}$ | $y'_{24}$ | $y'_{25}$ | $y'_{26}$ | $y'_{27}$ |
| $y'_{33}$ | $y'_{31}$ | $y'_{32}$ | $y'_{33}$ | $y'_{34}$ | $y'_{35}$ | $y'_{36}$ | $y'_{37}$ |
| $y'_{44}$ | $y'_{41}$ | $y'_{42}$ | $y'_{43}$ | $y'_{44}$ | $y'_{45}$ | $y'_{46}$ | $y'_{47}$ |
| $y'_{55}$ | $y'_{51}$ | $y'_{52}$ | $y'_{53}$ | $y'_{54}$ | $y'_{55}$ | $y'_{56}$ | $y'_{57}$ |
| $y'_{66}$ | $y'_{61}$ | $y'_{62}$ | $y'_{63}$ | $y'_{64}$ | $y'_{65}$ | $y'_{66}$ | $y'_{67}$ |
| $y'_{77}$ | $y'_{71}$ | $y'_{72}$ | $y'_{73}$ | $y'_{74}$ | $y'_{75}$ | $y'_{76}$ | $y'_{77}$ |

[FIG. 18]

| | | | | | | | | | |
|---|---|---|---|---|---|---|---|---|---|
| $y_{00}$ | $y_{01}$ | $y_{02}$ | $y_{03}$ | $y_{04}$ | $y_{05}$ | $y_{06}$ | $y_{07}$ | | |
| $y_{11}$ | $y_{11}$ | $y_{12}$ | $y_{13}$ | $y_{14}$ | $y_{15}$ | $y_{16}$ | $y_{17}$ | | |
| $y_{22}$ | $y_{21}$ | $y_{22}$ | $y_{23}$ | $y_{24}$ | $y_{25}$ | $y_{26}$ | $y_{27}$ | | |
| $y_{33}$ | $y_{31}$ | $y_{32}$ | $y_{33}$ | $y_{34}$ | $y_{35}$ | $y_{36}$ | $y_{37}$ | | |
| $y_{44}$ | $y_{41}$ | $y_{42}$ | $y_{43}$ | $y_{44}$ | $y_{45}$ | $y_{46}$ | $y_{47}$ | | |
| $y_{55}$ | $y_{51}$ | $y_{52}$ | $y_{53}$ | $y_{54}$ | $y_{55}$ | $y_{56}$ | $y_{57}$ | | |
| $y_{66}$ | $y_{61}$ | $y_{62}$ | $y_{63}$ | $y_{64}$ | $y_{65}$ | $y_{66}$ | $y_{67}$ | | |
| $y_{77}$ | $y_{71}$ | $y_{72}$ | $y_{73}$ | $y_{74}$ | $y_{75}$ | $y_{76}$ | $y_{77}$ | | |
| | | | | | | | | | |

ROW DIRECTION →

COLUMN DIRECTION ↓

[FIG. 19]
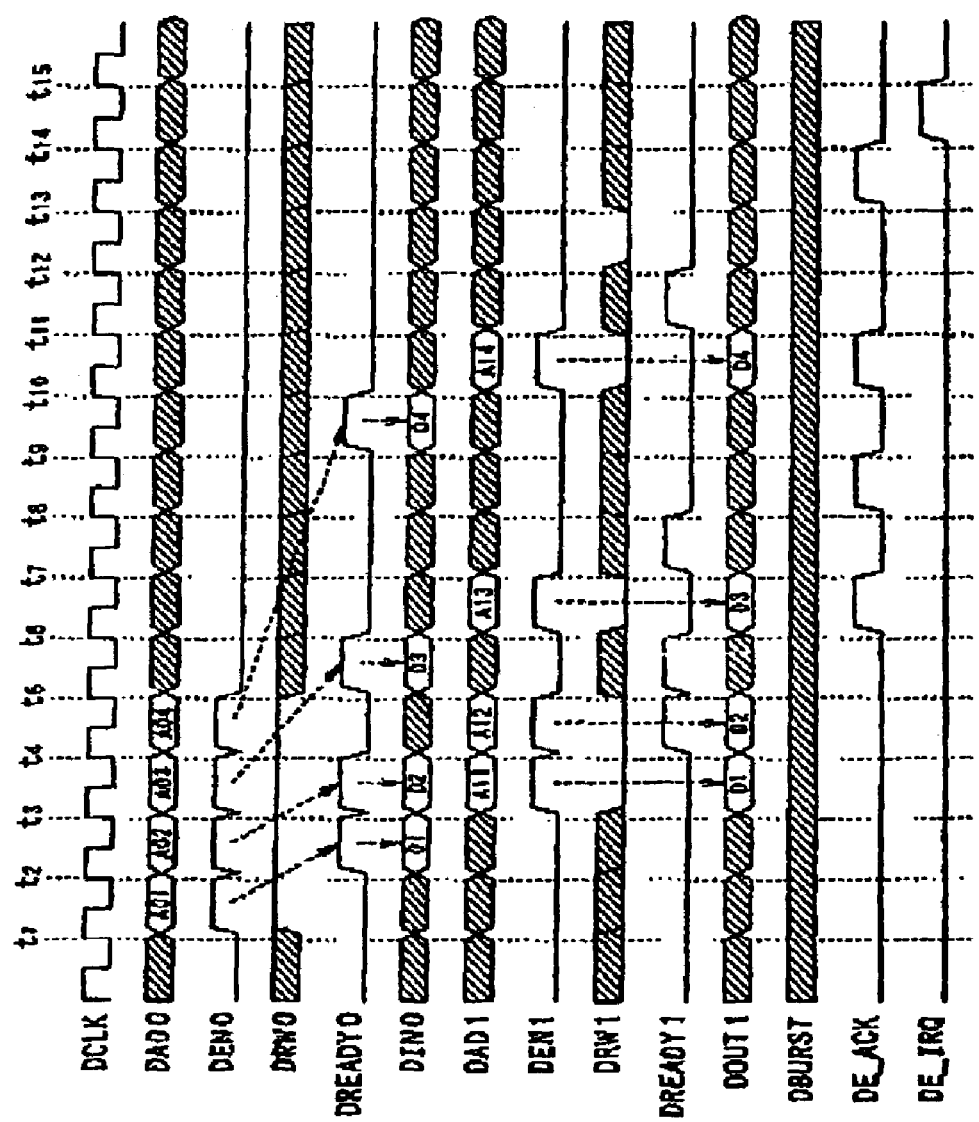

[FIG. 20]
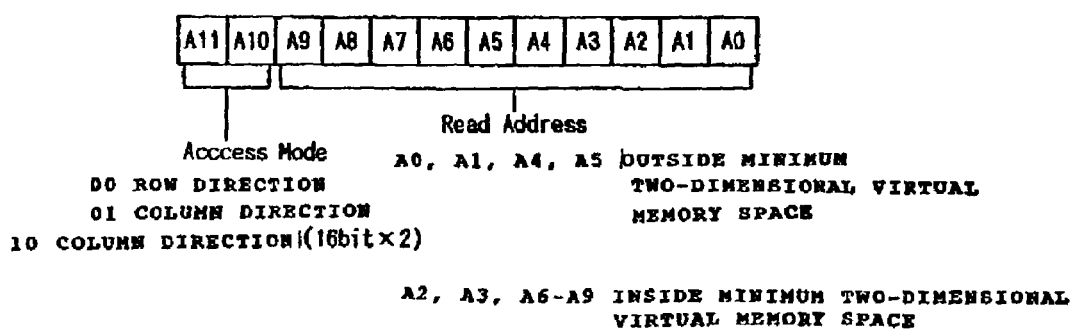

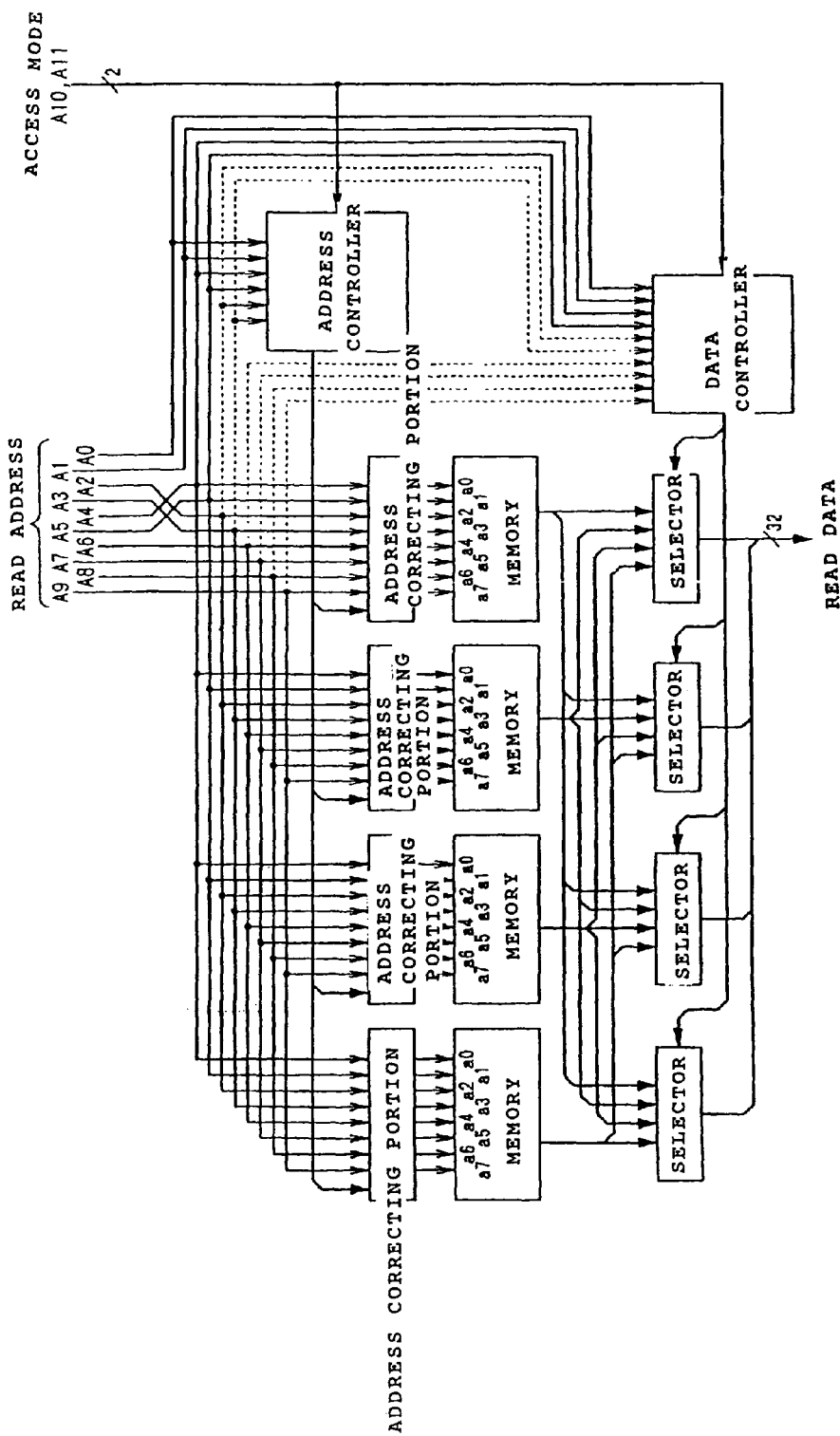
[FIG. 21]

DATA TRANSFER DEVICE AND METHOD FOR MULTIDIMENSIONAL MEMORY

BACKGROUND OF THE INVENTION

1. Field of Invention

The present invention relates to a device, a program, and a method for transferring data between a two-dimensional memory capable of realizing an efficient SIMD (Single Instruction stream Multiple Data stream) operation and a one-dimensional memory such as SRAM. More specifically, the invention relates to a data transfer device for multidimensional memory, a data transfer program for multidimensional memory, and a data transfer method for multidimensional memory capable of performing an efficient SIMD operation and suitable for transferring data between a multidimensional memory and a one-dimensional memory.

2. Description of Related Art

An SIMD operation is a technique for processing a plurality of data by using the same instruction with a plurality of processors. For this reason, in general, when a continuous part of data stream is taken out from a one-dimensional data stream stored in a memory and parallel operation is performed in respect thereto, the SIMD operation is considerably efficient.

However, when the data that is a target of the operation is not stored continuously in the memory or the operation result thereof is intended to be dispersively arranged at a predetermined position in the memory, a processing for preparing the data that is a target of parallel operation or a processing for arranging the result of parallel operation at a predetermined position in the memory is required. As a result, there is a disadvantage in that the intended effects of the original parallel processing are hindered.

On the other hand, there is a known technique capable of performing a two-dimensional discrete cosine transform at high speed by using the SIMD processing, as disclosed by Japanese Laid-Open Patent Application Publication No. 2000-69478. This invention teaches a process of rearranging image data arranged in a scanning order, in an order suitable for performing a butterfly operation in the transform encoding operation by using the SIMD processing, to store the rearranged result in the memory and to perform the two-dimensional discrete cosine transform of the image data stored in the memory.

However, in the invention, there is a problem in that the additional operations for rearranging the image data are required, and when they are to be realized by means of hardware, many circuits corresponding to the number of rearranging operations are required, thus increasing the size of the circuits. Further, there is an additional problem of increased power consumption caused by frequent memory accesses by the rearranging operations.

As one technique for solving these problems, a two-dimensional memory can be adopted in which memory space is constituted by a two-dimensional space as seen from accessing side. The two-dimensional memory can include, for example, n memories in which a two-dimensional memory space is constructed by arranging predetermined minimum two-dimensional virtual memory spaces in horizontal and vertical directions and in which each address of said minimum two-dimensional virtual memory spaces is previously assigned to each memory in a predetermined rule, a read data control unit for specifying an access position in the minimum two-dimensional virtual memory spaces when reading data, rearranging each read the data from the n memories in accordance with a read access mode for designating a direction or a pattern for reading data from the specified access position, and outputting each rearranged read data in a lump, and a read address control unit for correcting a designated read address to a predetermined address in accordance with the designated read access mode and the specified access position when designating read addresses, to output the corrected address to the n memories.

By this configuration, since continuous data or discontinuous data arranged in the horizontal direction or the vertical direction from the designated position in the two-dimensional memory spaces can be simultaneously read from the respective physical memories, it is possible to realize an efficient SIMD operation. Further, this two-dimensional memory is described in detail in Japanese Patent Application No. 2000-355945.

However, when the SIMD operation is executed, since the data of a targeted operation stored in SRAM, etc. (hereinafter, in light of two-dimensional memory, a normal memory such as SRAM is referred to as a one-dimensional memory) are read and stored into the two-dimensional memory to perform the operation on the data, a scheme for efficiently transferring data from the one-dimensional memory to the two-dimensional memory can be required. Similarly, after the operation is executed, since the operation data stored in the two-dimensional data is written on the one-dimensional memory, a scheme for efficiently transferring data from the two-dimensional memory to the one-dimensional memory can also be required. In this case, it is preferable that the data transfer should be more suitable for the operation, in contrast to the transferring process itself. That is, in SIMD operation, since there is a case that the operation is executed on the data of a predetermined area in the two-dimensional space, it is required that such data can be read from the one-dimensional memory in a lump.

This applies to a case where, not limited to the two-dimensional memory, data is transferred between a multidimensional memory in which the memory space is constituted by a multidimensional space as seen from accessing side and a one-dimensional memory as seen from accessing side.

SUMMARY OF THE INVENTION

Therefore, the present invention has been made in consideration of the above problems of the conventional art and has an object of providing a data transfer device for multidimensional memory, a data transfer program for multidimensional memory, and a data transfer method for multidimensional memory, capable of performing an efficient SIMD operation and suitable for transferring data between a multidimensional memory and a one-dimensional memory.

In order to achieve the above object, the data transfer device for multidimensional memory according to the present invention can be a device for transferring data between a multidimensional memory in which memory space is constituted by a multidimensional space as seen from accessing side and a one-dimensional memory in which memory space is constituted by a one-dimensional space as seen from accessing side. The invention can include a multidimensional memory reading device to read data of a predetermined area in the multidimensional space from the multidimensional memory, and a one-dimensional memory writing device to write the data read by the multidimensional memory reading means on the one-dimensional memory.

According to the above structure, by the multidimensional memory reading means, data of the predetermined area in the multidimensional space are read from the multidimensional memory and by the one-dimensional memory writing device, the read data are written on the one-dimensional memory.

Here, the multidimensional memory may have any one of different structure, if it is a memory in which memory space is constituted by a multidimensional space as seen from accessing side. In addition to two-dimensional memory in which memory space is constituted by a two-dimensional space, a multidimensional memory in which memory space is constituted by a multidimensional space having three dimensions or more may be included. Now, the same thing can be true for the data transfer device for multidimensional memory, the data transfer program for multidimensional memory, and the data transfer method for multidimensional memory of the present invention.

Further, the data transfer device for multidimensional memory according to the present invention is the data transfer device for multidimensional memory as described above, wherein the multidimensional memory reading device receives a read-reference address as a reference for reading data and a read-area specifying information for specifying a read area in the multidimensional space input thereto, and reads the data of the predetermined area in the multidimensional space from the multidimensional memory on the basis of the read-reference address and the read-area specifying information. According to the above structure, when the read-reference address and the read-area specifying information are input, by the multidimensional memory reading device, the data of the predetermined area in the multidimensional space are read from the multidimensional memory on the basis of the read-reference address and the read-area specifying information.

Here, the read-area specifying information may be any one of information for specifying a read area in the multidimensional space. For example, the read-area specifying information may be information indicating coordinates for specifying a shape of the read area, or when the read area is defined as a specified area such as rectangle or triangle, it may be information indicating a shape.

Further, the data transfer device for multidimensional memory according to the present invention is the data transfer device for multidimensional memory as described above, wherein the read-area specifying information can include a read-data-length information indicating a data length to be read in each dimension in the multidimensional space. The multidimensional memory reading device specifies the read area in the multidimensional space on the basis of a data length specified by each read-data-length information included in the read-area specifying information and the read-reference address, and reads the data of the specified read area from the multidimensional memory.

According to the above structure, when the read-reference address and the read-area specifying information are input, by the multidimensional memory reading device, the read area in the multidimensional space is specified on the basis of the data length specified by each read-data-length information included in the read-area specifying information and the read-reference address, and the data of the specified read area are read from the multidimensional memory.

Further, the data transfer device for multidimensional memory according to the present invention is the data transfer device for multidimensional memory as described above, wherein the read-area specifying information further can include a maximum data-length information indicating a maximum data length in a predetermined dimension in the multidimensional space. Further, the multidimensional memory reading device specifies the read area in the multidimensional space on the basis of the data length specified by each read-data-length information included in the read-area specifying information, the data length specified by the maximum data-length information included in the read-area specifying information, and the read-reference address, and reads the data of the specified read area from the multidimensional memory.

According to the above structure, when the read-reference address and the read-area specifying information are input, by the multidimensional memory reading device, the read area in the multidimensional space is specified on the basis of the data length specified by each read-data-length information included in the read-area specifying information, the data length specified by the maximum data-length information included in the read-area specifying information, and the read-reference address, and the data of the specified read area are read from the multidimensional memory.

Further, the data transfer device for multidimensional memory according to the present invention is the data transfer device for multidimensional memory as described above, wherein the one-dimensional memory writing device receives a write-reference address as a reference for writing data and a write-area specifying information for specifying a write area in the one-dimensional space input thereto, and writes the data read by the multidimensional memory reading device on the one-dimensional memory on the basis of the write-reference address and the write-area specifying information.

According to the above structure, when the write-reference address and the write-area specifying information are input, by the one-dimensional writing device, the read data are written on the one-dimensional memory on the basis of the write-reference address and the write-area specifying information.

Here, the write-area specifying information may be any one of information for specifying a write area in the one-dimensional space. For example, it may be an information indicating coordinates for specifying a shape of the write area, or when the write area is defined as a specified area such as rectangle or triangle, it may be information indicating a shape.

Further, the data transfer device for multidimensional memory according to the present invention is the data transfer device for multidimensional memory as described above, wherein when a multidimensional space having the same dimension as that of the multidimensional space is constructed logically in the one-dimensional memory, the write-area specifying information includes a maximum data-length information indicating a maximum data length in a predetermined dimension in the logical multidimensional space. Further, the one-dimensional memory writing device specifies a write area in the one-dimensional memory on the basis of the data length specified by each read-data-length information included in the read-area specifying information, the data length specified by the maximum data-length information included in the write-area specifying information, and the write-reference address, and writes the data read by the multidimensional memory reading device on the specified write area.

According to the above structure, when the write-reference address and the write-area specifying information are input, by the one-dimensional writing device, the write area in the one-dimensional memory is specified on the basis of the data length specified by each read-data-length information included in the read-area specifying information, the data length specified by the maximum data-length information included in the write-area specifying information, and the write-reference address, and the data are written on the specified write area.

Further, the data transfer device for multidimensional memory according to the present invention is the data transfer device for multidimensional memory as described above, wherein the one-dimensional memory writing device is set to one of a normal transfer mode for corresponding the read area to the write area and writing the data of the read area on the write area and a transposing transfer mode for transposing the read area and the write area and writing the data of the read area on the write area, and in accordance with a set transfer mode, writes the data read by the multidimensional memory reading means on the one-dimensional memory.

According to the above structure, when the normal transfer mode is set, by the one-dimensional memory writing device, the read area is corresponded to the write area and then the read data is written on the one-dimensional memory. Further, when the transposing transfer mode is set, by the one-dimensional memory writing device, the read area and the write area are transposed and then the read data is written on the one-dimensional memory.

Further, the data transfer device for multidimensional memory of the present invention is the data transfer device for multidimensional memory as described above, being connected to the multidimensional memory through a bus of a first burst length, wherein the multidimensional memory reading device reads data of the predetermined area in the multidimensional space from the multidimensional memory in a unit of the first burst length, and when the data to be read from the multidimensional memory has a data length less than the first burst length, reads only the data from the multidimensional memory in a unit of data having a data length less than the first burst length.

According to the above structure, by the multidimensional memory reading device, the data of the predetermined area in the multidimensional space are read from the multidimensional memory in a unit of the first burst length. When data to be read from the multidimensional memory has a data length less than the first burst length, only the data are read from the multidimensional memory in a unit of data having a data length less than the first burst length.

Further, the data transfer device for multidimensional memory of the present invention is the data transfer device for multidimensional memory as described above, being connected to the one-dimensional memory through a bus of a second burst length, wherein the one-dimensional memory writing means writes data read by the multidimensional memory reading means on the one-dimensional memory in a unit of the second burst length, and when data to be written on the one-dimensional memory has a data length less than the second burst length, writes only the data on the one-dimensional memory in a unit of data having a data length less than the second burst length.

According to the above structure, by the one-dimensional memory writing means, the read data are written on the one-dimensional memory in a unit of the second burst length. When data to be written on the one-dimensional memory has a data length less than the second burst length, only the data are written on the one-dimensional memory in a unit of data having a data length less than the second burst length.

Further, the data transfer device for multidimensional memory according to the present invention is the data transfer device for multidimensional memory for transferring data between a multidimensional memory in which memory space is constituted by a multidimensional space as seen from accessing side and a one-dimensional memory in which memory space is constituted by a one-dimensional space as seen from accessing side. The device can include a one-dimensional memory reading device for reading data from the one-dimensional memory, and a multidimensional memory writing device for writing the data read by the one-dimensional memory reading device on the multidimensional memory such that the data are arranged in a predetermined area in the multidimensional space.

According to the above structure, by the one-dimensional memory reading device, data are read from the one-dimensional memory and by the multidimensional memory writing device, the read data is written on the multidimensional memory such that the data are arranged in the predetermined area in the multidimensional space.

Further, the data transfer device for multidimensional memory according to the present invention is the data transfer device for multidimensional memory as described above, wherein the one-dimensional memory reading means receives a read-reference address as a reference for reading data and a read-area specifying information for specifying a read area in a logical multidimensional space when a multidimensional space having the same dimension as that of the multidimensional space is constructed logically in the one-dimensional memory input thereto, and reads the data of the predetermined area in the logical multidimensional space from the one-dimensional memory on the basis of the read-reference address and the read-area specifying information. According to the above structure, when the read-reference address and the read-area specifying information are input, by the one-dimensional memory reading means, the data of the predetermined area in the logical multidimensional space are read from the one-dimensional memory on the basis of the read-reference address and the read-area specifying information.

Here, the read-area specifying information may be any one of information for specifying a read area in the logical multidimensional space. For example, it may be information indicating coordinates for specifying a shape of the read area, or when the read area is defined as a specified area, such as rectangle or triangle, it may be information indicating a shape.

Further, the data transfer device for multidimensional memory according to the present invention is the data transfer device for multidimensional memory as described above, wherein the read-area specifying information includes a read-data-length information indicating a data length to be read in each dimension in the logical multidimensional space. Further, the one-dimensional memory reading device specifies the read area in the logical multidimensional space on the basis of a data length specified by each read-data-length information included in the read-area specifying information and the read-reference address, and reads the data of the specified read area from the one-dimensional memory.

According to the above structure, when the read-reference address and the read-area specifying information are input, by the one-dimensional memory reading device, the read area in the logical multidimensional space is specified on the basis of the data length specified by each read-data-length information included in the read-area specifying information and the read-reference address, and the data of the specified read area are read from the one-dimensional memory.

Further, the data transfer device for multidimensional memory according to the present invention is the data transfer device for multidimensional memory as described above, wherein the read-area specifying information further includes a maximum data-length information indicating a maximum data length in a predetermined dimension in the logical multidimensional space. Further, the one-dimensional memory reading device specifies the read area in the logical multidimensional space on the basis of the data length specified by each read-data-length information included in the read-area specifying information, the data length specified by the maximum data-length information included in the read-area specifying information, and the read-reference address, and reads the data of the specified read area from the one-dimensional memory.

According to the above structure, when the read-reference address and the read-area specifying information are input, by the one-dimensional memory reading device, the read area in the logical multidimensional space is specified on the basis of the data length specified by each read-data-length information included in the read-area specifying information, the data length specified by the maximum data-length information included in the read-area specifying information, and the read-reference address, and the data of the specified read area are read from the one-dimensional memory.

Further, the data transfer device for multidimensional memory according to the present invention is the data transfer device for multidimensional memory as described above, wherein the multidimensional memory writing means receives a write-reference address as a reference for writing data and a write-area specifying information for specifying a write area in the multidimensional space input thereto, and writes the data read by the one-dimensional memory reading means on the multidimensional memory on the basis of the write-reference address and the write-area specifying information. According to the above structure, when the write-reference address and the write-area specifying information are input, by the multidimensional writing device, the read data are written on the multidimensional memory on the basis of the write-reference address and the write-area specifying information.

Here, the write-area specifying information may be any one of information for specifying a write area in the multidimensional space. For example, it may be information indicating coordinates for specifying a shape of the write area, or when the write area is defined as a specified area, such as rectangle or triangle, it may be information indicating a shape.

Further, the data transfer device for multidimensional memory according to the present invention is the data transfer device for multidimensional memory as described above, wherein the write-area specifying information includes a maximum data-length information indicating a maximum data length in a predetermined dimension in the multidimensional space. Further, the multidimensional memory writing device specifies a write area in the multidimensional memory on the basis of the data length specified by each read-data-length information included in the read-area specifying information, a data length specified by the maximum data-length information included in the write-area specifying information, and the write-reference address, and writes the data read by the one-dimensional memory reading means on the specified write area.

According to the above structure, when the write-reference address and the write-area specifying information are input, by the multidimensional writing device, the write area in the multidimensional memory is specified on the basis of the data length specified by each read-data-length information included in the read-area specifying information, the data length specified by the maximum data-length information included in the write-area specifying information, and the write-reference address, and the data are written on the specified write area.

Further, the data transfer device for multidimensional memory according to the present invention is the data transfer device for multidimensional memory as described above, wherein the multidimensional memory writing device can be set to one of a normal transfer mode for corresponding the read area to the write area and writing the data of the read area on the write area and a transposing transfer mode for transposing the read area and the write area and writing the data of the read area on the write area, and in accordance with a set transfer mode, writes the data read by the one-dimensional memory reading device on the multidimensional memory.

According to the above structure, when the normal transfer mode is set, by the multidimensional memory writing device, the read area is corresponded to the write area and then the read data is written on the multidimensional memory. Further, when the transposing transfer mode is set, by the multidimensional memory writing device, the read area and the write area are transposed and then the read data is written on the multidimensional memory.

Further, the data transfer device for multidimensional memory according to the present invention is the data transfer device for multidimensional memory as described above, being connected to the multidimensional memory through a bus of a first burst length, wherein the multidimensional memory writing means writes the data read from the one-dimensional memory on the multidimensional memory in a unit of the first burst length, and when data to be written on the multidimensional memory has a data length less than the first burst length, writes only the data on the multidimensional memory in a unit of data having a data length less than the first burst length.

According to the above structure, by the multidimensional memory writing device, the read data are written on the multidimensional memory in a unit of the first burst length. When data to be written on the multidimensional memory has a data length less than the first burst length, only the data are written on the multidimensional memory in a unit of data having a data length less than the first burst length.

Further, the data transfer device for multidimensional memory according to the present invention is the data transfer device for multidimensional memory as described above, being connected to the one-dimensional memory through a bus of a second burst length, wherein the one-dimensional memory reading means reads data from the one-dimensional memory in a unit of the second burst length, and when the data to be read from the one-dimensional memory has a data length less than the second burst length, reads only the data from the one-dimensional memory in a unit of data having a data length less than the second burst length.

According to the above structure, by the one-dimensional memory reading device, the data of the predetermined area in the multidimensional space are read from the one-dimensional memory in a unit of the second burst length. When data to be read from the one-dimensional memory has a data length less than the second burst length, only the data are read from the one-dimensional memory in a unit of data having a data length less than the second burst length.

Further, the data transfer device for multidimensional memory according to the present invention is the data transfer device for multidimensional memory as described above, wherein the data transfer between the multidimensional memory and the one-dimensional memory is performed independently from operations of an operation processor which uses the multidimensional memory. According to the above structure, the data transfer between the multidimensional memory and the one-dimensional memory is performed independently from operations of an operation processor.

Further, the data transfer device for multidimensional memory according to the present invention is the data transfer device for multidimensional memory as described above, wherein the multidimensional memory can include n memories in which a two-dimensional memory space is constructed by arranging predetermined minimum two-dimensional virtual memory spaces in horizontal and vertical directions and in which each address of the minimum two-dimensional virtual memory spaces is previously assigned to each memories in a predetermined rule, a read-data control unit for specifying an access position in the minimum two-dimensional virtual memory space when reading data, rearranging each read data from the n memories in accordance with a read access mode for designating a direction or a pattern for reading data from the specified access position, and outputting each rearranged read data in a lump, and a read-address control unit for correcting a designated read address to a predetermined address in accordance with the designated read access mode and the specified access position when designating the read address or in accordance with the designated read access mode when a space to be accessed extends over adjacent the minimum two-dimensional virtual memory space, and outputting the address to the n memories.

According to the above structure, when designating the read address, by the read-address control unit, the designated read address can be corrected to the predetermined address in accordance with the designated read access mode and the specified access position, and the corrected address is output to the n memories. Further, when a space to be accessed extends over adjacent minimum two-dimensional virtual memory space, by the read-address control unit, the designated read address is corrected to the predetermined address in accordance with the designated read access mode, and the corrected address is output to the n memories. Moreover, when reading data, by the read-data control unit, the access position in the minimum two-dimensional virtual memory space is specified, each read data from the n memories are rearranged in accordance with the read access mode and each rearranged read data are output in a lump.

Further, the data transfer device for multidimensional memory according to the present invention is the data transfer device for multidimensional memory as described above, wherein the read-data control unit can include a data controller for outputting a selection signal for selecting read data in the n memories in accordance with the access position in the minimum two-dimensional virtual memory space specified according to a designation of the read address, and a designation of the read access mode when reading data, and n selectors provided correspondingly to the n memories, for selecting and simultaneously outputting each read data from the n memories on the basis of the selection signal from the data controller. Further, the read-address control unit can include an address controller for outputting an address conversion signal for converting the read address corresponding to lower address in each of the memories into a predetermined value in accordance with the read access mode and the read address when designating the read address, and for outputting a correcting signal for correcting the read address corresponding to upper address in each of the memories in accordance with the read access mode when a space to be accessed extends over adjacent the minimum two-dimensional virtual memory space, and n address correcting portions provided correspondingly to the n memories, for converting the read address into a predetermined value on the basis of the address conversion signal from the address controller to output the converted read address to the respective memories and correcting the read address on the basis of the correcting signal from the address controller to output the corrected read address to the respective memory.

According to the above structure, when designating the read address, by the address controller, the address conversion signal for converting the read address corresponding to lower address in each memory into a predetermined value is output in accordance with the read access mode and the read address, and by each address correcting portion, the read address is converted into a predetermined value on the basis of the address conversion signal and is output to the respective memories. Further, when a space to be accessed extends over adjacent the minimum two-dimensional virtual memory space, by the address controller, the correcting signal for correcting the read address corresponding to upper address in each memory in accordance with the read access mode is output and by each address correcting portion, the read address is corrected on the basis of the correcting signal and is output to the respective memories.

Further, when reading data, by the data controller, the access position in the minimum two-dimensional virtual memory space specified in accordance with a designation of the read address and the selection signal for selecting read data in the n memories in accordance with a designation of the read access mode, are output and by each selector, each read data from the n memories is selected on the basis of the selection signal and is output simultaneously.

On the other hand, in order to accomplish the above object, the data transfer program for multidimensional memory according to the present invention is the data transfer program for multidimensional memory for transferring data between a multidimensional memory in which memory space is constituted by multidimensional space as seen from accessing side and a one-dimensional memory in which memory space is constituted by a one-dimensional space as seen from accessing side, making a computer perform processes to be executed by a multidimensional memory reading device to read data of a predetermined area in the multidimensional space from the multidimensional memory, and a one-dimensional memory writing device to write the data read by the multidimensional memory reading device on the one-dimensional memory. According to the above structure, if the program is read by a computer, and the computer executes processes in accordance with the read program, effects similar to those of the data transfer device for multidimensional memory described above can be obtained.

Further, the data transfer program for multidimensional memory according to the present invention is the data transfer program for multidimensional memory for transferring data between a multidimensional memory in which memory space is constituted by a multidimensional space as seen from accessing side and a one-dimensional memory in which memory space is constituted by a one-dimensional space as seen from accessing side, making a computer perform processes to be executed by a one-dimensional memory reading device to read data from the one-dimensional memory, and a multidimensional memory writing device to write the data read by the one-dimensional memory reading means on the multidimensional memory such that the data are arranged in a predetermined area in the multidimensional space. According to the above structure, if the program is read by a computer, and the computer executes processes in accordance with the read program, effects similar to those of the data transfer device for multidimensional memory described above can be obtained.

On the other hand, in order to accomplish the above object, the data transfer method for multidimensional memory according to the present invention is the data transfer method for multidimensional memory for transferring data between a multidimensional memory in which memory space is constituted by a multidimensional space as seen from accessing side and a one-dimensional memory in which memory space is constituted by a one-dimensional space as seen from accessing side, including a multidimensional memory reading step for reading data of a predetermined area in the multidimensional space from the multidimensional memory, and a one-dimensional memory writing step for writing the data read by the multidimensional memory reading device on the one-dimensional memory.

Further, the data transfer method for multidimensional memory according to the present invention is the data transfer method for multidimensional memory for transferring data between a multidimensional memory in which memory space is constituted by a multidimensional space as seen from an accessing side and a one-dimensional memory in which memory space is constituted by a one-dimensional space as seen from the accessing side, including a one-dimensional memory reading step for reading data from the one-dimensional memory, and a multidimensional memory writing step for writing the data read by the one-dimensional memory reading step on the multidimensional memory, such that the data are arranged in a predetermined area in the multidimensional space.

BRIEF DESCRIPTION OF THE DRAWINGS

The invention will be described with reference to the accompanying drawings wherein like numerals reference like elements, and wherein:

FIG. 1 is an exemplary diagram illustrating a minimum two-dimensional virtual memory space 1;

FIG. 2 is an exemplary diagram illustrating a mapping onto a physical memory of the minimum two-dimensional virtual memory space;

FIG. 3 is an exemplary diagram illustrating a two-dimensional memory space 3 constructed on the basis of the minimum two-dimensional virtual memory space 1;

FIG. 4 is an exemplary diagram explaining access modes;

FIG. 5 is an exemplary block diagram illustrating a configuration of a two-dimensional data access memory 10;

FIG. 6 is an exemplary block diagram illustrating a configuration of a read-address control unit 11 and a read-data control unit 12;

FIG. 7 is an exemplary block diagram illustrating configurations of a write-address control unit 13 and a write-data control unit 14;

FIG. 8 is an exemplary diagram illustrating respective memory outputs each selector selects in accordance with a read address and a read access mode;

FIG. 9 is an exemplary diagram illustrating an example of converting the read address;

FIG. 10 is an exemplary diagram illustrating an example of correcting the read address;

FIG. 11 is an exemplary block diagram illustrating a configuration of an operation processor according to the present invention;

FIG. 12 is a conceptual diagram illustrating a case of transferring data in a normal transfer mode;

FIG. 13 is a flowchart illustrating an exemplary normal transfer processing;

FIG. 14 is a conceptual diagram illustrating a case of transferring data in a transposing transfer mode;

FIG. 15 is a flowchart illustrating a transposing transfer processing;

FIG. 16 is a diagram illustrating operations when two-dimensional DCT is performed by using a two-dimensional data access memory 10;

FIG. 17 is another diagram illustrating operations when two-dimensional DCT is performed by using the two-dimensional data access memory 10;

FIG. 18 is a yet another diagram illustrating operations when two-dimensional DCT is performed by using the two-dimensional data access memory 10;

FIG. 19 is a time chart illustrating a variation of signals input to and output from a DMAC 43;

FIG. 20 is an exemplary diagram illustrating an example of a data configuration when an access mode is assigned to the uppermost bit portion of an address signal; and FIG. 21 is an exemplary block diagram illustrating an example of configurations of a read-address control unit and a read-data control unit when signal is assigned as in FIG. 20.

DETAILED DESCRIPTION OF PREFERRED EMBODIMENTS

Now, embodiments of the present invention will be described with reference to the drawings. FIGS. 1 to 19 are diagrams for illustrating the embodiments of the data transfer device for multidimensional memory, the data transfer program for multidimensional memory, and the data transfer method for multidimensional memory according to the present invention.

In the present embodiment, the data transfer device for multidimensional memory, the data transfer program for multidimensional memory, and the data transfer method for multidimensional memory according to the present invention can be applied to the data transfer between a two-dimensional data access memory and a one-dimensional data access memory by a DMAC (Direct Memory Access Controller).

In the present embodiment, in addition to a one-dimensional data access memory such as SRAM, etc., a two-dimensional data access memory in which memory space is constituted by a two-dimensional space as seen from accessing side is employed. Since the two-dimensional data access memory defines a minimum two-dimensional virtual memory space 1 shown in FIG. 1, this will be described first. FIG. 1 is an exemplary diagram illustrating the minimum two-dimensional virtual memory space 1.

The minimum two-dimensional virtual memory space 1 is configured, for example, by arranging a total of sixteen (16) virtual memory elements 2, four (4) in the vertical direction and four (4) in the horizontal direction, and each virtual memory element 2 is a minimum unit being capable of storing 1 byte (8 bits), as shown in FIG. 1. Therefore, in this example, the minimum two-dimensional virtual memory space 1 is constituted by 4 bytes×4 bytes=16 bytes. Further, the size of the minimum two-dimensional virtual memory space 1 may be 8×8=64 bytes, etc. as well as the above 16 bytes.

Physically, the minimum two-dimensional virtual memory space 1 is previously divided and mapped into four physical memories 4A to 4D as shown in FIG. 2. That is, one minimum two-dimensional virtual memory space 1 corresponds to a continuous area of 4 bytes that is started from the same address in four physical memories 4A to 4D. Specifically, for example, the respective addresses $a_{n(0)}$, $b_{n(0)}$, $c_{n(0)}$, $d_{n(0)}$, . . . in the minimum two-dimensional virtual memory space 1 are previously assigned to the predetermined addresses $a_{n(0)}$, $b_{n(0)}$, $c_{n(0)}$, $d_{n(0)}$, . . . of the respective memories 4A to 4D, respectively.

Further, in the present embodiment, a two-dimensional memory space 3 as shown in FIG. 3 will be described. FIG. 3 is a diagram illustrating the two-dimensional memory space 3 formed from the minimum two-dimensional virtual memory spaces 1.

The two-dimensional memory space 3 is configured by arranging the minimum two-dimensional virtual memory spaces 1 in a tile shape in vertical and horizontal directions, as shown in FIG. 3. In the two-dimensional memory space 3, the number of minimum two-dimensional virtual memory spaces 1 arranged in the horizontal direction can be arbitrarily set if it is power of two. In the example of FIG. 3, the two-dimensional memory space 3 is constituted by 16 bytes×n bytes.

Next, a method for using the memories according to the present embodiment will be described with reference to FIGS. 1 to 4. First, suppose that, as shown in FIG. 3, two-dimensional memory space 3 is configured by arranging minimum two-dimensional virtual memory spaces 1 in a tile shape in vertical and horizontal directions. Meanwhile, the respective addresses of the minimum two-dimensional virtual memory spaces 1 are previously assigned (corresponded) to the respective predetermined addresses of four physical memories 4A to 4D determined by the relationship of the size of the minimum two-dimensional virtual memory space 1 (see FIGS. 1 and 2).

Next, a reading operation of the memories 4A to 4D for reading a continuous data from an arbitrary address in the minimum two-dimensional virtual memory space 1 will be described. In this case, an arbitrary read address thereof is designated together with a read access mode for designating a reading direction of data. In the read access mode, there are a row-direction access mode, a column-direction access mode and a row-direction two-step access mode.

The row-direction access mode is for reading data of 8 bits×4, 16 bits×2, or 32 bits×1 in the row direction (horizontal direction) from an arbitrary read address in the minimum two-dimensional virtual memory space 1 as shown in M1 of FIG. 4, and sixteen (16) access methods can be considered. The column-direction access mode is for reading data of 8 bits×4 in the column direction (vertical direction) from an arbitrary read address in the minimum two-dimensional virtual memory space 1 as shown in M2 of FIG. 4, and sixteen (16) access methods can be considered. The row-direction two-step access mode is for reading data of 16 bits×2 over two steps in the row direction from an arbitrary address in the minimum two-dimensional virtual memory space 1 as shown in M3 of FIG. 4, and eight (8) access methods can be considered. In this mode, the row-direction access is limited only to a unit of 2 bytes.

By doing this, when an arbitrary read address in the minimum two-dimensional virtual memory space 1 is designated and a read access mode is designated, the respective addresses corresponding to the memories 4A to 4D are designated on the basis of the designated read address and the designated read access mode, and data are then read and output simultaneously.

For example, in FIG. 4, when an address $c_{n(0)}$ is designated in the minimum two-dimensional virtual memory spaces 1 and the row-direction two-step access mode, as shown in M3 is designated, an address $a_{n(1)}$ of memory 4A, an address $b_{n(1)}$ of memory 4B, an address $c_{n(0)}$ of memory 4C, and an address $d_{n(0)}$ of memory 4D are designated, respectively, and each data thereof are read simultaneously.

Next, a writing operation of the memories 4A to 4D for simultaneously writing data on arbitrary address in the minimum two-dimensional virtual memory spaces 1 will be described. In this case, an arbitrary write address thereof is designated and a write access mode for designating the write direction of data is designated. By doing so, the respective addresses corresponding to the memories 4A to 4D are designated on the basis of the designated write address and the designated write access mode, and data are simultaneously written on the respective addresses.

For example, in FIG. 4, when an address $c_{n(0)}$ is designated in the minimum two-dimensional virtual memory spaces 1 and the row-direction two-step access mode as shown in M3 is designated, an address $a_{n(1)}$ of memory 4A, an address $b_{n(1)}$ of memory 4B, an address $c_{n(0)}$ of memory 4C, and an address $d_{n(0)}$ of memory 4D are designated, respectively, and each data thereof are written simultaneously.

As described above, by the method for employing the memory according to the present embodiment, when an arbitrary access position in the two-dimensional memory space 3 and an access mode are designated, data continuous in the vertical or horizontal direction from the arbitrary access position in the two-dimensional memory space 3 can be simultaneously read and written with respect to the respective memories 4A to 4D on the basis of the designation. As a result, the method for employing the memory according to the present embodiment can further contribute to the efficiency of SIMD operation.

Next, configuration of two-dimensional data access memory 10 will be described with reference to FIGS. 5 to 7. The two-dimensional data access memory 10 embodies the method for employing memory according to the above embodiment, and as shown in FIG. 5 can include memories 4A to 4D, a read-address control unit 11, a read-data control unit 12, a write-address control unit 13, and a write-data control unit 14.

Further, the read-address control unit 11 and the read-data control unit 12 constitute a data read system, the write-address control unit 13 and the write-data control unit 14 constitute a data write system and these two systems shares the memories 4A to 4D.

In the memories 4A to 4D, the two-dimensional memory space 3 can be configured by arranging the minimum two-dimensional virtual memory spaces 1 in vertical and horizontal directions as shown in FIG. 3 and the respective addresses of the minimum two-dimensional virtual memory spaces 1 are previously assigned to predetermined addresses in a predetermined rule as shown in FIG. 2.

The read-address control unit 11 converts predetermined addresses of the read addresses into predetermined values to output the converted address to the memories 4A to 4D in accordance with the designation of the read access mode when designating the read addresses, and corrects the other addresses of the read addresses in accordance with the designated read access mode when a space to be accessed extends over the adjacent minimum two-dimensional virtual memory space 1 to output the corrected addresses to the memories 4A to 4D.

The read-data control unit 12 specifies read addresses in the minimum two-dimensional virtual memory space 1 on the basis of some of the read addresses when reading data, rearranges each read data from the memories 4A to 4D in accordance with the specified read addresses and the designated read access mode and outputs simultaneously each rearranged read data.

The write-address control unit 13 converts predetermined addresses of the write addresses into predetermined values to output the converted addresses to the memories 4A to 4D in accordance with the designation of the write access mode when designating the write addresses, and corrects the other addresses of the write addresses in accordance with the designated write access mode when a space to be accessed extends over adjacent minimum two-dimensional virtual memory space 1, to output the corrected addresses to the memories 4A to 4D.

The write-data control unit 14 specifies write addresses in the minimum two-dimensional virtual memory space 1 on the basis of some of the write addresses when writing data to the memories 4A to 4D, respectively, rearranges each write data to the memories 4A to 4D in accordance with the specified write addresses and the designated write access mode and outputs simultaneously each rearranged write data to each designated address of the memories 4A to 4D, respectively.

Next, configurations of the read-address control unit 11 and the read-data control unit 12 will be described in detail with reference to FIG. 6. FIG. 6 is an exemplary block diagram illustrating configurations of the read-address control unit 11 and the read-data control unit 12.

The read-address control unit 11 can include an address controller 21 and four address correcting portions 22A to 22D, as shown in FIG. 6.

The address controller 21 outputs an address conversion signal for converting the read addresses A4, A5 corresponding to addresses a0, a1 of lower 2 bits in the memories 4A to 4D into predetermined values to the address correcting portions 22A to 22D, in accordance with the designation of the read addresses A0, A1, A4, A5 and the designation of the read access mode, and outputs a correcting signal for correcting the read addresses A2, A3, A6 to A9 corresponding to addresses a2 to a7 of upper 5 bits in the memories 4A to 4D to the address correcting portions 22A to 22D, in accordance with designation of the read access mode when a space to be accessed extends over the adjacent minimum two-dimensional virtual memory space 1.

Here, the read addresses "A0, A1" are for designating the row-direction (horizontal-direction) addresses of the minimum two-dimensional virtual memory spaces 1 and correspond to lower addresses a0, a1 of the memories 4A to 4D. Further, the read addresses "A4, A5" are for designating the column-direction (vertical-direction) addresses of the minimum two-dimensional virtual memory spaces 1. Further, the read addresses A2, A3, A6 to A9 are for designating addresses of the two-dimensional memory space 3 and correspond to addresses a2 to a7 of the memories 4A to 4D.

The address correcting portions 22A to 22D are provided correspondingly to the memories 4A to 4D, for converting the read addresses A4, A5, into predetermined values on the basis of the address conversion signal from the address controller 21, to output the converted read addresses as addresses a0, a1 of lower bits of each memory 4A to 4D and for correcting the read addresses A2, A3, A6 to A9 by a predetermined value on the basis of the correcting signal from the address controller 21, to output the corrected read addresses as addresses a2 to a7 of upper 5 bits of the memories 4A to 4D.

The read-data control unit 12 can include a data controller 23 and four selectors 24A to 24D, as shown in FIG. 6. The data controller 23 specifies the read addresses in the minimum two-dimensional virtual memory spaces 1 in accordance with the designation of the read addresses A0, A1, A4, A5 when reading data and outputs selection signals, when the selectors 24A to 24D select the memories 4A to 4D, to the selectors 24A to 24D, respectively, in accordance with the read access mode for designating the direction of reading data from the specified read addresses.

The selectors 24A to 24D are provided correspondingly to the memories 4A to 4D, for selecting and simultaneously outputting the read data on the output lines of the respective memories 4A–4D on the basis of the selection signals from the data controller 23.

Next, configurations of the write-address control unit 13 and the write-data control unit 14 will be described in detail with reference to FIG. 7. FIG. 7 is an exemplary block diagram illustrating configurations of the write-address control unit 13 and the write-data control unit 14.

The write-address control unit 13 can include an address controller 31 and four address correcting portions 32A to 32D, as shown in FIG. 7. The address controller 31 outputs an address conversion signal for converting the write addresses A4, A5 corresponding to addresses a0, a1 of lower 2 bits in the memories 4A to 4D into predetermined values, to the address correcting portions 32A to 32D, in accordance with the designation of the write addresses A0, A1, A4, A5 and the designation of the write access mode, and outputs a correcting signal for correcting by a predetermined value the write addresses A2, A3, A6 to A9 corresponding to addresses a2 to a7 of upper 5 bits in the memories 4A to 4D, to the address correcting portions 32A to 32D, in accordance with the designation of the write access mode when a space to be accessed extends over the adjacent minimum two-dimensional virtual memory space 1.

Here, the write access mode is basically similar to the read access mode and includes three access modes.

The address correcting portions 32A to 32D are provided correspondingly to the memories 4A to 4D, for converting the write addresses A4, A5 on the basis of the address conversion signal from the address controller 31 to output the converted write addresses as addresses a0, a1 of lower two bits in each memory 4A to 4D and for correcting the write addresses A2, A3, A6 to A9 on the basis of the correcting signal from the address controller 31 to output the corrected write addresses as addresses a2 to a7 of upper 5 bits in the memories 4A to 4D.

The write-data control unit 14 can include a data controller 33 and four selectors 34A to 34D, as shown in FIG. 7. The data controller 33 specifies the write addresses in the minimum two-dimensional virtual memory spaces 1 in accordance with the designation of the write addresses A0, A1, A4, A5 when writing data and outputs selection signals, when the selectors 34A to 34D select the memories 4A to 4D, to the selectors 34A to 34D, respectively, in accordance with the write access mode for designating the direction of writing data from the specified write addresses.

The selectors 34A to 34D are provided correspondingly to the memories 4A to 4D, for simultaneously supplying the write data (for example, 32 bits) from outside, for example, in a unit of 8 bits to the respective designated addresses of the respective memories 4A to 4D on the basis of the selection signals from the data controller 33.

Next, operations of the two-dimensional data access memory 10 will be described with reference to FIGS. 8 to 10.

First, a case of reading data will be described. In this case, a control of the read addresses by the address controller 21 and the address correcting portion 22A to 22D and a control of the read data by the data controller 23 and the selectors 24A to 24D are required, and explanations will be provided from the data controller 23.

The data controller 23 specifies the read addresses in the minimum two-dimensional virtual memory spaces 1 in accordance with the designation of the read addresses A0, A1, A4, A5 when reading data, and outputs the selection signals, when the selectors 24A–24D select the memories 4A–4D, to the selectors 24A–24D in accordance with the read access mode, respectively.

For example, as shown in No. 1 of FIG. 8, when "00", "00" are designated as the read address "A0, A1", "A4, A5" and the row-direction access mode (00) is designated as the read access mode, the selector 24A selects the memory 4A, the selector 24B selects the memory 4B, the selector 24C selects the memory 4C, and the selector 24D selects the memory 4D, respectively.

Further, for example, as shown in No. 17 of FIG. 8, when "00", "00" are designated as the read address "A0, A1", "A4, A5" and the column-direction access mode (01) is designated as the read access mode, the selector 24A selects the memory 4A, the selector 24B selects the memory 4C, the selector 24C selects the memory 4B, and the selector 24D selects the memory 4D, respectively.

The selectors 24A to 24D simultaneously output the read data on the output lines of the respective memories 4A–4D on the basis of the selection signal from the data controller 23 when reading data.

For example, in a case of No. 1 of FIG. 8 as described above, the respective read data (for example, 8 bits) on the output lines of the memories 4A–4D, that is, data of the memory 4A by the selector 24A, data of the memory 4B by the selector 24B, data of the memory 4C by the selector 24C, and data of the memory 4D by the selector 24D, are simultaneously output when reading data. Further, in a case of No. 17 of FIG. 8, the respective read data on the output lines of the memories 4A to 4D, that is, data of the memory 4A by the selector 24A, data of the memory 4C by the selector 24B, data of the memory 4B by the selector 24C, and data of the memory 4D by the selector 24D, are simultaneously output when reading data.

On the other hand, the address controller 21 outputs an address conversion signal for converting the read addresses A4, A5 corresponding to addresses a0, a1 of lower 2 bits in the memories 4A to 4D into predetermined values to the address correcting portions 22A to 22D, in accordance with the designation of the read addresses A0, A1, A4, A5 and the designation of the read access mode.

For example, as shown in FIG. 9, when the row-direction access mode is designated as the read access mode and the read address "A4, A5" are designated, conversion of the designated read addresses "A4, A5" are not performed. Therefore, for example, when "00" are designated as the read addresses "A4, A5", the "00" are output as each address "a0, a1" of the memories 4A to 4D.

On the contrary, as shown in FIG. 9, when the column-direction access mode or the row-direction two-step access mode is designated as the read access mode and the read addresses "A4, A5" are designated, the conversion of the designated read addresses "A4, A5" is performed. For example, when the column-direction access mode is designated as the read access mode and "00" are designated as the read addresses "A4, A5", the conversion of the respective addresses "a0, a1" of the memory 4A is not performed but the respective addresses "a0, a1" of the memories 4B, 4C, and 4D are converted into "01", "10", and "11", respectively and output.

Further, the address controller 21 outputs the designated read addresses A2, A3, A6 to A9 as addresses corresponding to addresses a2 to a7 of upper 5 bits in the memories 4A to 4D as is or outputs to the address correcting portions 22A to 22D a correcting signal for correcting the designated read addresses A2, A3, A6 to A9 to output the corrected addresses as addresses a2 to a7 of upper 5 bits in the memories 4A to 4D, in accordance with designation of the read access mode when a space to be accessed extends the over adjacent minimum two-dimensional virtual memory space 1.

For example, as shown in No. 2 of FIG. 10, when the row-direction access mode is designated as the read access mode and "1000" are designated as the read addresses A0, A1, A4, A5, the address controller 21 outputs the correcting signal for adding "+1" to the addresses a2 to a7 in the memory 22A, to the address correcting portion 22A. Therefore, "+1" or "+4" in FIG. 10 means that "+1" or "+4" is added to the addresses a2 to a7 in the memory 22A.

Next, a case of writing data will be described. In this case, a control of the write addresses by the address controller 31 and the address correcting portion 32A to 32D and a control of the write data by the data controller 33 and the selectors 34A to 34D are required.

However, control operations of the write addresses by the address controller 31 and the address correcting portions 32A to 32D are substantially equal to control operations of the read addresses by the address controller 21 and the address correcting portions 22A to 22D, and thus explanation thereof will be omitted.

The data controller 33 specifies the write addresses in the minimum two-dimensional virtual memory spaces 1 in accordance with the designation of the write addresses A0, A1, A4, A5, and outputs the selection signals, when the selectors 34A to 34D select the memories 4A to 4D, to the selectors 34A–34D in accordance with the write access mode for designating the direction of writing data from the specified write addresses, respectively, when writing data. Further, operations of the data controller 33 are basically similar to those of the data controller 23.

Further, the selectors 34A to 34D select each write data from outside on the basis of the selection signals from the data controller 33, and then simultaneously supply each write data to the designated addresses of the respective memories 4A to 4D.

As described above, according to the two-dimensional data access memory 10, since continuous data arranged in a line in the vertical or horizontal direction from the designated position in the two-dimensional memory space 3 can be simultaneously read from the physical memories 4A to 4D, and data can be simultaneously written on the respective memories 4A to 4D such that the data are continuously arranged in the vertical or horizontal direction from the specified position in the two-dimensional memory space 3, it is possible to realize an efficient SIMD operation.

Next, a configuration of an operation processor according to the present invention will be described with reference to FIG. 11. FIG. 11 is an exemplary block diagram illustrating the configuration of the operation processor according to the present invention. The operation processor is constructed by making a SIMD type processor 42 executes two-dimensional discrete cosine transform (DCT).

The operation processor, as shown in FIG. 11, can include a one-dimensional data access memory 41, a two-dimensional data access memory 10, a SIMD type processor 42 for performing SIMD operation using the one-dimensional data access memory 41 and the two-dimensional data access memory 10, and a DMAC 43 for transferring data between the one-dimensional data access memory 41 and the two-dimensional data access memory 10.

The SIMD type processor 42 can designate addresses when reading or writing data in two-dimensional data access memory 10 in accordance with a predetermined operation processing to be described later, and access mode thereof can be set by a command program.

The DMAC 43 is connected to the one-dimensional data access memory 41 and the two-dimensional data access memory 10 through a bus of a predetermined burst length (for example, 4 bytes), and transmits data between the one-dimensional data access memory 41 and the two-dimensional data access memory 10 in a unit of a rectangular memory area. As data transfer mode, a normal transfer mode for transferring the rectangular memory area as is and a transposing transfer mode for transposing and transferring the rectangular memory area can be set, and the transfer mode is set to any one of the modes by means of a command from the SIMD type processor 42.

Next, a normal transfer processing to be performed by the DMAC 43 will be described with reference to FIGS. 12 and 13. FIG. 12 is a conceptual diagram illustrating a case of transferring data in the normal transfer mode. FIG. 13 is a flowchart illustrating the normal transfer processing. The normal transfer processing is a processing for transferring data between the one-dimensional data access memory 41 and the two-dimensional data access memory 10 when the normal transfer mode is set as the transfer mode.

In a case that data is transmitted from the two-dimensional data access memory 10 to the one-dimensional data access memory 41, as shown in FIG. 12, when a data length in the horizontal direction in a two-dimensional space constructed logically in the two-dimensional data access memory 10 is FrameX and a data length in the horizontal direction in a two-dimensional space constructed logically in the one-dimensional data access memory 41 is FrameX', the data transfer is performed by transferring a rectangular area in the logical two-dimensional space of the two-dimensional data access memory 10 as is to the logical two-dimensional space of the one-dimensional data access memory 41.

For the rectangular area of the two-dimensional data access memory 10, the position and the size thereof can be specified by a transfer source address SA as a reference for reading data from the two-dimensional data access memory 10, a horizontal-direction data length Rect.X of the rectangular area and a vertical-direction data length Rect.Y of the rectangular area. Further, for the rectangular area of the one-dimensional data access memory 41, the position and the size thereof are specified by means of a transfer destination address DA as a reference for writing data to the one-dimensional data access memory 41, a horizontal-direction data length Rect.X of the rectangular area and a vertical-direction data length Rect.Y of the rectangular area.

When transferring data, in the SIMD type processor 42, the routine first proceeds to step S100, as shown in FIG. 13. In step S100, the routine sets the transfer source address SA to the register, proceeds to step S102 to set the transfer destination address DA to the register, proceeds to step S104 to set the data length FrameX to the register, proceeds to step S106 to set the data length FrameX' to the register, and then proceeds to step S108.

The routine sets the data length Rect.X to the register in step S108, proceeds to step S110 to set the data length Rect.Y to the register, proceeds to step S112 to set the normal transfer mode as the transfer mode to the register, proceeds to step S114 to instruct the start of data transfer by setting the control register and to finish a series of processes to return to the original process.

The DMAC 43 can perform the normal transfer processing when the normal transfer mode is set and the control register is set, and as shown in FIG. 13, the routine first proceeds to step S200.

The routine changes the status to a busy state in step S200, proceeds to step S202 to set the data length Rect.Y to a variable y, proceeds to step S204 to set the data length Rect.X to a variable x and proceeds to step S206.

The routine determines whether the value of variable y is greater than "0" or not, when it is determined that the value of variable y is greater than "0" (Yes), proceeds to step S208 to determine whether or not the value of variable x is the burst length (in above example, 4 bytes) or more, and when it is determined that the value of variable x is the burst length or more (Yes), proceeds to step S210.

The routine reads data in a unit of the burst length from the two-dimensional data access memory 10 on the basis of the transfer source address SA in step S210, proceeds to step S212 to write data in a unit of the burst length on the one-dimensional data access memory 41 on the basis of the transfer destination address DA, and then proceeds to step S214.

The routine subtracts the burst length from the value of variable x in step S214, proceeds to step S228 to add the burst length to the transfer source address SA, proceeds to step S230 to add the burst length to the transfer destination address DA, and then proceeds to step S208.

On the other hand, when it is determined in step S208 that the value of variable x is less than the burst length (No), the routine proceeds to step S232 to read data of bytes corresponding to the value of variable x from the two-dimensional data access memory 10 on the basis of the transfer source address SA, proceeds to step S250 to write data of bytes corresponding to the value of variable x to the one-dimensional data access memory 41 on the basis of the transfer destination address DA, and then proceeds to step S252.

In step S252, the routine adds the result of subtracting the data length Rect.X from the added value of the variable x and the data length FrameX, to the transfer source address SA, proceeds to step S254 to add the result of subtracting the data length Rect.X from the added value of the variable x and the data length FrameX', to the transfer destination address DA, proceeds to step S256 to subtract "1" from the value of variable y, and then proceeds to step S204.

On the other hand, when it is determined in step S206 that the value of variable y is "0" or less (No), the routine proceeds to step S258 to change the finishing status to an end state. The changing of the finishing status is performed in accordance with the write finishing response output through step S300 in the one-dimensional data access memory 41.

Subsequently, the routine proceeds to step S260 to determine whether the value of interrupt mask flag is "0" or not, when it is determined that the value of interrupt mask flag is not "0" (No), proceeds to step S262 to change the status to a ready state and finishes a series of processes to return to the original processing.

On the other hand, when it is determined in step S260 that the value of interrupt mask flag is "0" (Yes), the routine proceeds to step S264 to output a request to the interrupt controller and finishes a series of processes to return to the original processing.

Further, when the request is input, the interrupt controller outputs an interrupt signal to the SIMD type processor 42, and when the interrupt signal is input, in the SIMD type processor 42, the routine proceeds to step S120 to perform an exceptional process. When the exceptional process is performed, in the DMAC 43, the routine drops the end bit of the finishing status through step S266 and finishes a series of processes to return to the original processing.

Next, in a case of transferring data from the one-dimensional data access memory 41 to the two-dimensional data access memory 10, as shown in FIG. 12, when the horizontal-direction data length of the logical two-dimensional space of the one-dimensional data access memory 41 is FrameX and the horizontal-direction data length of the logical two-dimensional space of the two-dimensional data access memory 10 is FrameX', the data transfer is executed by transferring the rectangular area in the logical two-dimensional space of the one-dimensional data access memory 41 as is to the logical two-dimensional space of the two-dimensional data access memory 10.

For the rectangular area in the one-dimensional data access memory 41, the position and the size thereof are specified by means of the transfer source address SA as a reference for reading data from the one-dimensional data access memory 41, the horizontal-direction data length Rect.X of the rectangular area, and the vertical-direction data length Rect.Y of the rectangular area. Further, for the rectangular area in the two-dimensional data access memory 10, the position and the size thereof are specified by means of the transfer destination address DA as a reference for writing data on the two-dimensional data access memory 10, the horizontal-direction data length Rect.X of the rectangular area, and the vertical-direction data length Rect.Y of the rectangular area.

In this case, in the DMAC 43, the routine performs the normal transfer processing in the same way as in the case of transferring data from the two-dimensional data access memory 10 to the one-dimensional data access memory 41. Therefore, a detailed explanation thereof will be omitted.

Next, the transposing transfer processing performed by the DMAC 43 will be described with reference to FIGS. 14 and 15. FIG. 14 is a conceptual diagram illustrating a case of transferring data in the transposing transfer mode. FIG. 15 is a flowchart illustrating the transposing transfer processing.

The transposing transfer processing is for transferring data between the one-dimensional data access memory 41 and the two-dimensional data access memory 10 when the transposing transfer mode is set as the transfer mode.

In a case of transferring data from the two-dimensional data access memory 10 to the one-dimensional data access memory 41, as shown in FIG. 14, when the horizontal-direction data length of the logical two-dimensional space of the two-dimensional data access memory 10 is FrameX and the horizontal-direction data length of the logical two-dimensional space of the one-dimensional data access memory 41 is FrameX', the data transfer is executed by transposing and transferring the rectangular area in the logical two-dimensional space of the two-dimensional data access memory 10 to the logical two-dimensional space of the one-dimensional data access memory 41.

For the rectangular area in the two-dimensional data access memory 10, the position and the size thereof are specified by the transfer source address SA as a reference for reading data from the two-dimensional data access memory 10, the horizontal-direction data length Rect.X of the rectangular area, and the vertical-direction data length Rect.Y of the rectangular area. Further, for the rectangular area in the one-dimensional data access memory 41, the position and the size thereof are specified by means of the transfer destination address DA as a reference for writing data to the one-dimensional data access memory 41, the horizontal-direction data length Rect.X of the rectangular area, and the vertical-direction data length Rect.Y of the rectangular area.

When transferring data, in the SIMD type processor 42, the routine first proceeds to step S100, as shown in FIG. 15.

In step S100, the routine sets the transfer source address SA to the register, proceeds to step S102 to set the transfer destination address DA to the register, proceeds to step S104 to set the data length FrameX to the register, proceeds to step S106 to set the data length FrameX' to the register, and then proceeds to step S108.

The routine sets the data length Rect.X to the register in step S108, proceeds to step S110 to set the data length Rect.Y to the register, proceeds to step S112 to set the transposing transfer mode as the transfer mode to the register, proceeds to step S114 to instruct start of data transfer by setting the control register and to finish a series of processes, then returning to the original process.

The DMAC 43 performs the transposing transfer processing when the transposing transfer mode is set and the control register is set, and as shown in FIG. 15, the routine first proceeds to step S200.

The routine changes the status to a busy state in step S200, proceeds to step S202 to set the data length Rect.Y to a variable y, proceeds to step S204 to set the data length Rect.X to a variable x and proceeds to step S206.

The routine determines whether the value of variable y is greater than "0" or not, in step S206, when it is determined that the value of variable y is greater than "0" (Yes), proceeds to step S208 to determine whether or not the value of variable x is the burst length (in the above example, 4 bytes) or more, and when it is determined that the value of variable x is the burst length or more (Yes), proceeds to step S210.

The routine reads data in a unit of the burst length from the two-dimensional data access memory 10 on the basis of the transfer source address SA in step S210, proceeds to step S214 to subtract the burst length from the value of variable x, proceeds to step S216 to set the burst length to variable n, and then proceeds to step S218.

The routine writes data of 1 byte to the one-dimensional data access memory 41 on the basis of the transfer destination address DA, proceeds to step S220 to add the data length FrameX' to the transfer destination address DA, proceeds to step S222 to subtract "1" from the value of variable n, and then proceeds to step S224.

The routine determines whether the value of variable n is greater than "0" or not, when it is determined that the value of variable n is greater than "0" (Yes), proceeds to step S218, and when it is determined that the value of variable n is not greater than "0" (No), proceeds to step S226 to add the burst length to the transfer source address SA, and then proceeds to step S208.

On the other hand, when it is determined in step S208 that the value of variable x is less than the burst length (No), the routine proceeds to step S232 to read data of bytes corresponding to the value of variable x from the two-dimensional data access memory 10 on the basis of the transfer source address SA, proceeds to step S234 to set the value of variable x to variable n, and then proceeds to step S236.

In step S236, the routine writes data of 1 byte on the one-dimensional data access memory 41 on the basis of the transfer destination address DA, proceeds to step S238 to add the data length FrameX' to the transfer destination address DA, proceeds to step S240 to subtract "1" from the value of variable n, and then proceeds to step S242.

In step S242, the routine determines whether the value of variable n is greater than "0" or not, when it is determined that the value of variable n is greater than "0" (Yes), proceeds to step S236, and when it is determined that the value of variable n is not greater than "0" (No), proceeds to step S244.

In step S244, the routine adds the result of subtracting the data length Rect.X from the added value of the variable x and the data length FrameX, to the transfer source address SA, proceeds to step S246 to add the result of subtracting "1" from the multiplied value of the data length FrameX' and the data length Rect.X, to the transfer destination address DA, proceeds to step S248 to subtract "1" from the value of variable y, and then proceeds to step S204.

On the other hand, when it is determined in step S206 that the value of variable y is "0" or less (No), the routine proceeds to step S258 to change the finishing status to an end state. The changing of the finishing status is performed in accordance with the write finishing response output through step S300 in the one-dimensional data access memory 41.

Subsequently, the routine proceeds to step S260 to determine whether the value of interrupt mask flag is "0" or not, when it is determined that the value of interrupt mask flag is not "0" (No), proceeds to step S262 to change the status to a ready state and to finish a series of processes, then returning to the original processing.

On the other hand, when it is determined in step S260 that the value of interrupt mask flag is "0" (Yes), the routine proceeds to step S264 to output a request to the interrupt controller and to finish a series of processes, then returning to the original processing.

Further, when the request is input, the interrupt controller outputs an interrupt signal to the SIMD type processor 42 and when the interrupt signal is input, in the SIMD type processor 42, the routine proceeds to step S120 to perform exceptional process. When the exceptional process is performed, the in DMAC 43, the routine drops the end bit of the finishing status through step S266 and finishes a series of processes to return to the original processing.

Next, in a case of transferring data from the one-dimensional data access memory 41 to the two-dimensional data access memory 10, as shown in FIG. 14, when the horizontal-direction data length of the logical two-dimensional space of the one-dimensional data access memory 41 is FrameX and the horizontal-direction data length of the logical two-dimensional space of the two-dimensional data access memory 10 is FrameX', the data transfer is executed by transposing and transferring the rectangular area in the logical two-dimensional space of the one-dimensional data access memory 41 to the logical two-dimensional space of the two-dimensional data access memory 10.

For the rectangular area in the one-dimensional data access memory 41, the position and the size thereof are specified by the transfer source address SA as a reference for reading data from the one-dimensional data access memory 41, the horizontal-direction data length Rect.X of the rectangular area, and the vertical-direction data length Rect.Y of the rectangular area. Further, for the rectangular area in the two-dimensional data access memory 10, the position and the size thereof are specified by means of the transfer destination address DA as a reference for writing data on the two-dimensional data access memory 10, the horizontal-direction data length Rect.X of the rectangular area, and the vertical-direction data length Rect.Y of the rectangular area.

In this case, and in the DMAC 43, the routine performs the transposing transfer processing in the same way as in the case of transferring data from the two-dimensional data access memory 10 to the one-dimensional data access memory 41. Therefore, a detailed explanation thereof will be omitted.

Next, operations of the present embodiment will be described with reference to the drawings.

First, a case of performing two-dimensional DCT by the SIMD type processor 42 using the two-dimensional data access memory 10 will be described with reference to FIGS. 16 to 18. FIGS. 16 to 18 are diagrams illustrating operations when the two-dimensional DCT is performed using the two-dimensional data access memory 10.

First, as shown in FIG. 16, 8×8 pixel data that are a target of the two-dimensional DCT are read from the one-dimensional data access memory 41, and the read data are written on the two-dimensional data access memory 10.

Subsequently, the SIMD type processor 42 performs one-dimensional DCT in the row direction. For this purpose, as shown in FIG. 16, the SIMD type processor 42 pairs the pixel data of even row and the pixel data of odd row to read two pixel data in the column direction and simultaneously performs one-dimensional DCT of two rows by the SIMD operation.

Further, as shown in FIG. 17, the routine reversely writes a result of the one-dimensional DCT in the row direction on the two-dimensional data access memory 10.

Further, the SIMD type processor 42 performs the one-dimensional DCT in the column direction. In this case, as shown in FIG. 17, the SIMD type processor 42 pairs the pixel data of even column and the pixel data of odd column to read two pixel data in the row direction, simultaneously performs one-dimensional DCT of two columns by the SIMD operation, and reversely writes the result on the two-dimensional data access memory 10. As a result, the final result of the two-dimensional DCT as shown in FIG. 18 remains in the two-dimensional data access memory 10.

As described above, since the two-dimensional data access memory 10 is employed, it is possible to efficiently perform the SIMD operation.

Next, a case of transferring data in the normal transfer mode between the two-dimensional data access memory 10 and the one-dimensional data access memory 41 will be described with reference to FIG. 19. FIG. 19 is a time chart illustrating variation of signals input to and output from the DMAC 43.

When data are transmitted in the normal transfer mode from the two-dimensional data access memory 10 to the one-dimensional data access memory 41, in the SIMD type processor 42, the transfer source address SA, the transfer destination address DA, the data length FrameX, the data length FrameX', the data length Rect.X, and the data length Rect.Y are set, respectively, through steps S100 to S112 and the normal transfer mode is set as the transfer mode. Further, through step S114, the start of data transfer is instructed by setting the control register. These settings are performed on the registers of the DMAC 43.

When the normal transfer mode is set and the control register is set, in the DMAC 43, the routine changes the status to the busy state, sets the data length Rect.Y to variable y, and sets the data length Rect.X to variable x, through steps S200 to S204. Subsequently, through steps S210 and S212, data are read in a unit of a burst length from the two-dimensional data access memory 10 on the basis of the transfer source address SA, and the data are written in a unit of a burst length on the one-dimensional data access memory 41 on the basis of the transfer destination address DA.

Specifically, the data transfer is executed at timing as shown in FIG. 19. Further, in FIG. 19, DCLK indicates a clock signal. Further, DAD0, DEN0, DRW0, DREADY0, and DIN0 are input/output signals for the two-dimensional data access memory 10. That is, DAD0 indicates an address signal to memory, DEN0 indicates a bus enable signal to the memory, DRW0 indicates a signal for indicating reading, DREADY0 indicates a response signal from the memory, and DIN0 indicates a read data signal from the memory, respectively. Further, DAD1, DEN1, DRW1, DREADY1, and DOUT1 are input/output signals for the one-dimensional data access memory 41. That is, DAD1 indicates an address signal to the memory, DEN1 indicates a bus enable signal to the memory, DRW1 indicates a signal for indicating writing, DREADY1 indicates a response signal from the memory, and DOUT1 indicates a write data signal to the memory, respectively. Further, DE_IRQ indicates an interrupt signal output from the DMAC 43 to the interrupt controller.

First, when the address signals DAD0 are output to the two-dimensional data access memory 10 at time $t_0$ to $t_4$, data are read on the basis of the respective address signals DAD0 and input to the DMAC 43 at time $t_2$, $t_3$, $t_5$, $t_9$.

Then, the data input at time $t_2$ are output to the one-dimensional data access memory 41 together with the address signal DAD1 at time $t_3$, and data input at time $t_3$ are output to the one-dimensional data access memory 41 together with the address signal DAD1 at time $t_4$, respectively, to be written on the one-dimensional data access memory 41. Further, the data input at time $t_5$ are output to the one-dimensional data access memory 41 together with the address signal DAD1 at time $t_6$, and the data input at time $t_9$ are output to the one-dimensional data access memory 41 together with the address signal DAD1 at time $t_{10}$, respectively, to be written on the one-dimensional data access memory 41.

Subsequently, through steps S214, S228, and S230, the burst length is subtracted from the value of variable x, and the burst length is added to the transfer source address SA and the transfer destination address DA, respectively. A series of transfer processes in steps S210 to S230 are repeated until the value of variable x is less than the burst length. As a result, the whole remainder except for fractions of the burst length out of data of one row of the rectangular area is transmitted to the one-dimensional data access memory 41.

When the value of variable x is less than the burst length, the data of bytes corresponding to the value of variable x are read from the two-dimensional data access memory 10 on the basis of the transfer source address SA, and the data of bytes corresponding to the value of variable x are written on the one-dimensional data access memory 41 on the basis of the transfer destination address DA, through steps S232 and S250. This data transfer is performed at timing as shown in FIG. 19. As a result, all the data of one row of the rectangular area are transmitted to the one-dimensional data access memory 41.

Subsequently, through steps S252 to S256, the result of subtracting the data length Rect.X from the added value of the variable x and the data length FrameX is added to the transfer source address SA, the result of subtracting the data length Rect.X from the added value of the variable x and the data length FrameX' is added to the transfer destination address DA, and also "1" is subtracted from the value of variable y. A series of transfer processes in steps S204 to S256 are repeated until the value of variable y is "0" or less. As a result, the whole data of the rectangular area are transmitted to the one-dimensional data access memory 41.

On the other hand, when data are transmitted in the normal transfer mode from the one-dimensional data access memory 41 to the two-dimensional data access memory 10, the data transfer is performed in the same way as described above.

Next, a case of transferring data in the transposing transfer mode between the two-dimensional data access memory 10 and the one-dimensional data access memory 41 will be described.

When data are transmitted in the transposing transfer mode from the two-dimensional data access memory 10 to the one-dimensional data access memory 41, in the SIMD type processor 42, the transfer source address SA, the transfer destination address DA, the data length FrameX, the data length FrameX', the data length Rect.X, and the data length Rect.Y are set, respectively, through steps S100 to S112, and the transposing transfer mode is set as the transfer mode. Then, through step S114, the start of data transfer is instructed by setting the control register. These settings are performed on the registers of the DMAC 43.

When the transposing transfer mode is set and the control register is set, in the DMAC 43, the status is changed to the busy state, the data length Rect.Y is set to variable y, and the data length Rect.X is set to variable x, through steps S200 to S204. Subsequently, through steps S210 and S214, data are read in a unit of a burst length from the two-dimensional data access memory 10 on the basis of the transfer source address SA and the burst length is subtracted from the value of variable x. Subsequently, data of 1 byte are written on the one-dimensional data access memory 41 on the basis of the transfer destination address DA, and the data length FrameX' is added to the transfer destination address DA. These writing and adding are repeated many times corresponding to the burst length.

Subsequently, through steps S226, the burst length is added to the transfer source address SA. A series of transfer processes in steps S210 to S226 are repeated until the value of variable x is less than the burst length. As a result, the whole remainder except for fractions of the burst length out of data of one row of the rectangular area is transmitted to the one-dimensional data access memory 41. It is noted that since the transfer mode is the transposing transfer mode, the data are transferred in vertical direction to the one-dimensional data access memory 41 as shown in FIG. 14.

When the value of variable x is less than the burst length, through step S232, data of bytes corresponding to the value of variable x are read from the two-dimensional data access memory 10 on the basis of the transfer source address SA. Subsequently, through steps S234 to S240, data of 1 byte are written on the one-dimensional data access memory 41 on the basis of the transfer destination address DA, and the data length FrameX' is added to the transfer destination address DA. These writing and adding are repeated many times corresponding to the value of variable x. As a result, all the data of one row of the rectangular area are transmitted to the one-dimensional data access memory 41. Further, since the transfer mode is the transposing transfer mode, as shown in FIG. 14, data are transmitted in the vertical direction to the one-dimensional data access memory 41.

Subsequently, through steps S244 to S248, the result of subtracting the data length Rect.X from the added value of the variable x and the data length FrameX is added to the transfer source address SA, the result of subtracting "1" from the multiplied value of the data length FrameX' and the data length Rect.X is added to the transfer destination address DA, and also "1" is subtracted from the value of variable y. A series of transfer processes in steps S204 to S248 are repeated until the value of variable y is "0" or less. As a result, the whole data of the rectangular area are transmitted to the one-dimensional data access memory 41.

On the other hand, when data are transmitted in the transposing transfer mode from the one-dimensional data access memory 41 to the two-dimensional data access memory 10, the data transfer is performed in the same way as described above. Further, in this case, since data are written continuously in the vertical direction on the two-dimensional data access memory 10 at the data writing side, it is not limited to being written in a byte unit as described above on the two-dimensional data access memory 10, but the data may be written in a unit of a burst length. The latter can perform higher-speed data transfer.

By doing so, in the present embodiment, the DMAC 43 reads data of the rectangular area in the logical two-dimensional space of the two-dimensional data access memory 10 from the two-dimensional data access memory 10, and writes the read data on the one-dimensional data access memory 41.

As a result, since data transfer can be performed in a unit of the rectangular area in the two-dimensional space from the two-dimensional data access memory 10 to the one-dimensional data access memory 41, a data transfer highly suitable for the SIMD operation can be performed between the two-dimensional data access memory 10 and the one-dimensional data access memory 41. Further, by using the two-dimensional data access memory 10, an efficient SIMD operation can be realized.

Further, in the present embodiment, the DMAC 43 specifies the read area in the logical two-dimensional space of the two-dimensional data access memory 10 on the basis of the data lengths Rect.X and Rect.Y and the transfer source address SA, and reads data of the specified read area from the two-dimensional data access memory 10.

As a result, since the size of the read area can be set by the data lengths Rect.X and Rect.Y, when the size of the read area is adjusted in accordance with the contents of the SIMD operation, the data transfer corresponding to the adjusted size can be performed. Therefore, a data transfer more suitable for the SIMD operation can be performed between the two-dimensional data access memory 10 and the one-dimensional data access memory 41.

Further, in the present embodiment, the DMAC 43 specifies the read area in the logical two-dimensional space of the two-dimensional data access memory 10 on the basis of the data lengths Rect.X and Rect.Y, the data length FrameX, and the transfer source address SA, and reads data of the specified read area from the two-dimensional data access memory 10.

As a result, since the size of the logical two-dimensional space of the two-dimensional data access memory 10 can be set by the data length FrameX, when the size of the logical two-dimensional space of the two-dimensional data access memory 10 is adjusted in accordance with the contents of the SIMD operation, the data transfer corresponding to the adjusted size can be performed. Therefore, a data transfer more suitable for the SIMD operation can be performed between the two-dimensional data access memory 10 and the one-dimensional data access memory 41.

Further, in the present embodiment, the DMAC 43 specifies the write area in the logical two-dimensional space of the one-dimensional data access memory 41 on the basis of the data lengths Rect.X and Rect.Y, the data length FrameX', and the transfer destination address DA, and writes the read data on the specified write area.

As a result, since the size of the logical two-dimensional space of the one-dimensional data access memory 41 can be set by the data length FrameX', when the size of the logical two-dimensional space of the one-dimensional data access memory 41 is adjusted in accordance with the contents of the SIMD operation, the data transfer corresponding to the adjusted size can be performed. Therefore, the data transfer more suitable for the SIMD operation can be performed between the two-dimensional data access memory 10 and the one-dimensional data access memory 41.

Further, in the present embodiment, the DMAC 43 can set one of the normal transfer mode for corresponding the read area to the write area and writing the data of the read area to the write area and the transposing transfer mode for transposing the read area and the write area and writing the data of the read area on the write area, and writes the read data on the one-dimensional data access memory 41 in accordance with the set transfer mode.

As a result, since data can be transmitted not only as is, but also by the transposing transfer, when the transposing transfer is required in accordance with the contents of the SIMD operation, the data transfer corresponding thereto can be performed. Therefore, the data transfer more suitable for the SIMD operation can be performed between the two-dimensional data access memory 10 and the one-dimensional data access memory 41.

Further, in the present embodiment, the DMAC 43 is connected to the two-dimensional data access memory 10 through a bus of a predetermined burst length, reads the data of the rectangular area in the logical two-dimensional space of the two-dimensional data access memory 10 in a unit of a burst length from the two-dimensional data access memory 10, and when the data to be read from the two-dimensional data access memory 10 has a data length less than the burst length, reads only the data in a unit of data having a data length less than the burst length from the two-dimensional data access memory 10.

As a result, since data reading from the two-dimensional data access memory 10 can be performed almost in a unit of the burst length, the data transfer can be performed relatively at high speed between the two-dimensional data access memory 10 and the one-dimensional data access memory 41. Further, since the data having a data length less than the burst length can be properly transmitted, a possibility that unnecessary data are written on the one-dimensional data access memory 41 in transferring data can be reduced.

Further, in the present embodiment, the DMAC 43 is connected to the one-dimensional data access memory 41 through a bus of a predetermined burst length, writes the read data in a unit of a burst length on the one-dimensional data access memory 41, and when the data to be written on the one-dimensional data access memory 41 has a data length less than the burst length, writes only the data in a unit of data having a data length less than the burst length on the one-dimensional data access memory 41.

As a result, since data writing to the one-dimensional data access memory 41 can be performed almost in a unit of the burst length, the data transfer can be performed relatively at high speed between the two-dimensional data access memory 10 and the one-dimensional data access memory 41. Further, since the data having a data length less than the burst length can be properly transmitted, a possibility that unnecessary data are written on the one-dimensional data access memory 41 in transferring data can be reduced.

Further, in the present embodiment, the DMAC 43 reads data from the one-dimensional data access memory 41 and writes the read data on the two-dimensional data access memory 10 such that the data are arranged in the rectangular area in the logical two-dimensional space of the two-dimensional data access memory 10.

As a result, since data can be transmitted in a unit of the rectangular area in the two-dimensional space from the one-dimensional data access memory 41 to the two-dimensional data access memory 10, a data transfer highly suitable for the SIMD operation can be performed between the two-dimensional data access memory 10 and the one-dimensional data access memory 41. Further, by using the two-dimensional data access memory 10, an efficient SIMD operation can be realized.

Further, in the present embodiment, the DMAC 43 specifies the read area in the logical two-dimensional space of the one-dimensional data access memory 41 on the basis of the data lengths Rect.X and Rect.Y and the transfer source address SA, and reads the data of the specified read area from the one-dimensional data access memory 41.

As a result, since the size of the read area can be set by the data lengths Rect.X and Rect.Y, when the size of the read area is adjusted in accordance with the contents of the SIMD operation, a data transfer corresponding to the adjusted size can be performed. Therefore, a data transfer more suitable for the SIMD operation can be performed between the two-dimensional data access memory 10 and the one-dimensional data access memory 41.

Further, in the present embodiment, the DMAC 43 specifies the read area in the logical two-dimensional space of the one-dimensional data access memory 41 on the basis of the data lengths Rect.X and Rect.Y, the data length FrameX, and the transfer source address SA, and reads the data of the specified read area from the one-dimensional data access memory 41.

As a result, since the size of the logical two-dimensional space of the one-dimensional data access memory 41 can be set by the data length FrameX, when the size of the logical two-dimensional space of the one-dimensional data access memory 41 is adjusted in accordance with the contents of the SIMD operation, a data transfer corresponding to the adjusted size can be performed. Therefore, a data transfer more suitable for the SIMD operation can be performed between the two-dimensional data access memory 10 and the one-dimensional data access memory 41.

Further, in the present embodiment, the DMAC 43 specifies the write area in the two-dimensional data access memory 10 on the basis of the data lengths Rect.X and Rect.Y, the data length FrameX', and the transfer destination address DA, and writes the read data on the specified write area.

As a result, since the size of the logical two-dimensional space of the two-dimensional data access memory 10 can be set by the data length FrameX', when the size of the logical two-dimensional space of the two-dimensional data access memory 10 is adjusted in accordance with the contents of the SIMD operation, a data transfer corresponding to the adjusted size can be performed. Therefore, a data transfer more suitable for the SIMD operation can be performed between the two-dimensional data access memory 10 and the one-dimensional data access memory 41.

Further, in the present embodiment, the DMAC 43 can set one of the normal transfer mode for corresponding the read area to the write area and writing the data of the read area on the write area and the transposing transfer mode for transposing the read area and the write area and writing the data of the read area on the write area, and writes the read data on the two-dimensional data access memory 10 in accordance with the set transfer mode.

As a result, since data can be transmitted not only as is but also by the transposing transfer, when the transposing transfer is required in accordance with the contents of the SIMD operation, a data transfer corresponding thereto can be performed. Therefore, a data transfer more suitable for the SIMD operation can be performed between the two-dimensional data access memory 10 and the one-dimensional data access memory 41.

Further, in the present embodiment, the DMAC 43 is connected to the two-dimensional data access memory 10 through a bus of a predetermined burst length, writes data read from the one-dimensional data access memory 41 in a unit of a burst length to the two-dimensional data access memory 10, and when data to be written on the two-dimensional data access memory 10 has a data length less than the burst length, writes only the data in a unit of data having a data length less than the burst length on the two-dimensional data access memory 10.

As a result, since data writing on the two-dimensional data access memory 10 can be performed almost in a unit of the burst length, the data transfer can be performed relatively at high speed between the two-dimensional data access memory 10 and the one-dimensional data access memory 41. Further, since the data having a data length less than the burst length can be properly transmitted, a possibility that unnecessary data are written on the two-dimensional data access memory 10 in transferring data can be reduced.

Further, in the present embodiment, the DMAC 43 is connected to the one-dimensional data access memory 41 through a bus of a predetermined burst length, reads data in a unit of a burst length from the one-dimensional data access memory 41, and when the data to be read from the one-dimensional data access memory 41 has a data length less than the burst length, reads only the data in a unit of data having a data length less than the burst length from the one-dimensional data access memory 41.

As a result, since data reading from the one-dimensional data access memory 41 can be performed almost in a unit of the burst length, the data transfer can be performed relatively at high speed between the two-dimensional data access memory 10 and the one-dimensional data access memory 41. Further, since the data having a data length less than the burst length can be properly transmitted, a possibility that unnecessary data are written on the two-dimensional data access memory 10 in transferring data can be reduced.

Further, in the present embodiment, the DMAC 43 performs the data transfer between the two-dimensional data access memory 10 and the one-dimensional data access memory 41, independently from the operations of the SIMD type processor 42. As a result, loads of the SIMD type processor 42 can be reduced in transferring data, and the data transfer can be performed relatively at high speed between the two-dimensional data access memory 10 and the one-dimensional data access memory 41.

Further, in the present embodiment, the two-dimensional data access memory 10 can include physical memories 4A to 4D in which a two-dimensional memory space 3 is constructed by arranging predetermined minimum two-dimensional virtual memory spaces 1 in horizontal and vertical directions and in which each address of the predetermined minimum two-dimensional virtual memory spaces 1 is previously assigned to each memories in a predetermined rule, a read-data control unit 12 for specifying an access position in the minimum two-dimensional virtual memory space 1 when reading data, rearranging each read data from the physical memories 4A to 4D in accordance with the read access mode for designating a direction or a pattern for reading data from the specified access position and outputting each rearranged read data in a lump, and a read-address control unit 11 for correcting the designated read address to a predetermined address in accordance with the designated read access mode and the specified access position when designating the read address or in accordance with the designated read access mode when a space to be accessed extends over adjacent the minimum two-dimensional virtual memory space 1, to output the corrected address to the physical memories 4A to 4D.

As a result, since continuous data arranged in the vertical or horizontal direction from the designated position in the two-dimensional memory space 3 can be simultaneously read from the physical memories 4A to 4D and the data can be simultaneously written on the respective physical memories 4A to 4D, such that the data are continuously arranged in the vertical or horizontal direction from the designated position in the two-dimensional memory space 3, an efficient SIMD operation can be realized.

Further, in the above embodiment, although it has been described that a signal for designating the access mode is input through a signal line separate from the signal line for the address signal (the read address signal or the write address signal), the signal for designating the access mode and the address signal may be input through the same signal line. For example, as shown in FIG. 20, the access mode may be assigned to the uppermost bit portion of the address signal. FIG. 21 is an exemplary block diagram illustrating an example of configurations of the read-address control unit and the read-data control unit when a signal is assigned as in FIG. 20.

By such configurations, when processing is performed using the two-dimensional data access memory 10, since a user inputs the access mode at the same time of inputting address, input operation becomes simpler. Further, since the configuration of the two-dimensional data access memory 10 becomes simpler, it is possible to reduce the size of circuits to improve the degree of integration.

Further, in the above embodiment, although the two-dimensional data access memory 10 has constructed to be connected directly to the DMAC 43, but not limited to, the two-dimensional data access memory 10 may be connected to the DMAC 43 through a memory I/F.

Further, in the above embodiment, although the one-dimensional data access memory 41 has been constructed to be connected directly to the DMAC 43, but not limited to, the one-dimensional data access memory 41 may be connected to the DMAC 43 through a memory I/F.

Further, in the above embodiment, although the DMAC 43 has been constructed to perform the normal transfer processing and the transposing transfer processing, but not limited to, a computer, such as the SIMD type processor 42, etc. may be constructed to perform the processes on the basis of a program for executing the normal transfer processing and the transposing processing. In this case, CPU as an operation processor writes the program stored in ROM to RAM and performs the normal transfer processing and the transposing transfer processing in accordance with the written program. Of course, the program is not limited to being stored in ROM but may be stored in other storage medium. In this case, the program stored in the storage medium may be written to RAM, and then the processing may be performed.

Here, the storage medium can include all the storage medium, if it is computer-readable, such as a semiconductor storage medium like RAM and ROM, a magnetic write type storage medium like floppy disks and hard disks, a storage medium of optical reading type like CD, CDV, LD and DVD, and a magnetic write/optical read type storage medium like MO, irrespective of the reading method such as electronic reading, magnetic reading, optical reading, and the like.

Further, in the above embodiment, although the data transfer device for multidimensional memory, the data transfer program for multidimensional memory, and the data transfer method for multidimensional memory according to the present invention, have been applied to a case of transferring data between the two-dimensional data access memory 10 and the one-dimensional data access memory 41 by the DMAC 43, but not limited to, they may be applied to other cases without departing from the scope of the present invention.

As described above, according to the data transfer device for multidimensional memory of the present invention, since data transfer can be performed in a unit of a predetermined area in the multidimensional space from multidimensional memory to one-dimensional memory, a data transfer highly suitable for the SIMD operation can be achieved between the multidimensional memory and the one-dimensional memory. Further, by using the multidimensional memory, an efficient SIMD operation can be realized.

Further, according to the data transfer device for multidimensional memory of the present invention, since the data transfer can be performed by only inputting the read reference address and the read-area specifying information, the data transfer can be achieved easily.

Further, according to the data transfer device for multidimensional memory of the present invention, since the size of the read area can be set by the read-data-length information, when the size of the read area is adjusted in accordance with the contents of the SIMD operation, a data transfer corresponding to the adjusted size can be performed. Therefore, the data transfer more suitable for the SIMD operation can be achieved between the multidimensional memory and the one-dimensional memory.

Further, according to the data transfer device for multidimensional memory of the present invention, since the size of the multidimensional space can be set by the maximum data-length information, when the size of the multidimensional space is adjusted in accordance with the contents of the SIMD operation, a data transfer corresponding to the adjusted size can be performed. Therefore, a data transfer more suitable for the SIMD operation can be achieved between the multidimensional memory and the one-dimensional memory.

Further, according to the data transfer device for multidimensional memory of the present invention, since the data transfer can be performed by only inputting the read reference address, the read-area specifying information, the write reference address, and the write-area specifying information, a data transfer can be achieved easily.

Further, according to the data transfer device for multidimensional memory of the present invention, since the size of the logical multidimensional space can be set by the maximum data-length information, when the size of the logical multidimensional space is adjusted in accordance with the contents of the SIMD operation, a data transfer corresponding to the adjusted size can be performed. Therefore, a data transfer more suitable for the SIMD operation can be achieved between the multidimensional memory and the one-dimensional memory.

Further, according to the data transfer device for multidimensional memory of the present invention, since the data transfer can be performed not only as is but also by means of the transposing transfer, when the transposing transfer is required in accordance with the contents of the SIMD operation, the data transfer corresponding thereto can be performed. Therefore, a data transfer more suitable for the SIMD operation can be achieved between the multidimensional memory and the one-dimensional memory.

Further, according to the data transfer device for multidimensional memory of the present invention, since the data reading from the multidimensional memory can be performed almost in a unit of the first burst length, a data transfer can be achieved relatively at high speed between the multidimensional memory and the one-dimensional memory. Further, since the data having a data length less than the first burst length can be properly transmitted, a possibility that unnecessary data are written on the one-dimensional memory in transferring data can be reduced.

Further, according to the data transfer device for multidimensional memory of the present invention, since the data writing on the one-dimensional memory can be performed almost in a unit of the second burst length, a data transfer can be achieved relatively at high speed between the multidimensional memory and the one-dimensional memory. Further, since the data having a data length less than the second burst length can be properly transmitted, a possibility that unnecessary data are written on the one-dimensional memory in transferring data can be reduced.

Further, according to the data transfer device for multidimensional memory of the present invention, since data can be transmitted in a unit of a predetermined area in the multidimensional space from one-dimensional memory to multidimensional memory, a data transfer highly suitable for the SIMD operation can be achieved between the multidimensional memory and the one-dimensional memory. Further, by using the multidimensional memory, an efficient SIMD operation can be realized.

Further, according to the data transfer device for multidimensional memory of the present invention, since data can be transmitted by only inputting the read reference address and the read-area specifying information, the data transfer can be achieved easily.

Further, according to the data transfer device for multidimensional memory of the present invention, since the size of the read area can be set by the read-data-length information, when the size of the read area is adjusted in accordance with the contents of the SIMD operation, a data transfer corresponding to the adjusted size can be performed. Therefore, a data transfer more suitable for the SIMD operation can be achieved between the multidimensional memory and the one-dimensional memory.

Further, according to the data transfer device for multidimensional memory of the present invention, since the size of the logical multidimensional space can be set by the maximum data-length information, when the size of the logical multidimensional space is adjusted in accordance with the contents of the SIMD operation, a data transfer corresponding to the adjusted size can be performed. Therefore, a data transfer more suitable for the SIMD operation can be achieved between the multidimensional memory and the one-dimensional memory.

Further, according to the data transfer device for multidimensional memory of the present invention, since the data transfer can be performed by only inputting the read reference address, the read-area specifying information, the write reference address, and the write-area specifying information, a data transfer can be achieved easily.

Further, according to the data transfer device for multidimensional memory of the present invention, since the size of the multidimensional space can be set by the maximum data-length information, when the size of the multidimensional space is adjusted in accordance with the contents of the SIMD operation, the data transfer corresponding to the adjusted size can be performed. Therefore, a data transfer more suitable for the SIMD operation can be achieved between the multidimensional memory and the one-dimensional memory.

Further, according to the data transfer device for multidimensional memory of the present invention, since the data transfer can be performed not only as is but also by means of the transposing transfer, when the transposing transfer is required in accordance with the contents of the SIMD operation, the data transfer corresponding thereto can be performed. Therefore, a data transfer more suitable for the SIMD operation can be achieved between the multidimensional memory and the one-dimensional memory.

Further, according to the data transfer device for multidimensional memory of the present invention, since the data writing on the multidimensional memory can be performed almost in a unit of the first burst length, a data transfer can be achieved relatively at high speed between the multidimensional memory and the one-dimensional memory. Further, since the data having a data length less than the first burst length can be properly transmitted, a possibility that unnecessary data are written on the multidimensional memory in transferring data can be reduced.

Further, according to the data transfer device for multidimensional memory of the present invention, since the data reading from the one-dimensional memory can be performed almost in a unit of the second burst length, a data transfer can be achieved relatively at high speed between the multidimensional memory and the one-dimensional memory. Further, since the data having a data length less than the second burst length can be properly transmitted, a possibility that unnecessary data are written on the multidimensional memory in transferring data can be reduced.

Further, according to the data transfer device for multidimensional memory of the present invention, loads of the operation processor can be reduced in transferring data and the data transfer can be achieved relatively at high speed between the multidimensional memory and the one-dimensional memory.

Further, according to the data transfer device for multidimensional memory of the present invention, since the continuous data arranged in the vertical or horizontal direction from the designated position in the multidimensional memory space can be simultaneously read from the respective physical memories, and the data can be simultaneously written on the respective physical memories such that the data are continuously arranged in the vertical or horizontal direction from the designated position in the multidimensional memory space, an efficient SIMD operation can be realized.

Meanwhile, according to the data transfer program for multidimensional memory of the present invention, an effect equal to that of the data transfer device for multidimensional memory described above can be obtained.

Further, according to the data transfer program for multidimensional memory of the present invention, an effect equal to that of the data transfer device for multidimensional memory described above can be obtained.

Meanwhile, according to the data transfer method for multidimensional memory of the present invention, an effect equal to that of the data transfer device for multidimensional memory described above can be obtained.

Further, according to the data transfer method for multidimensional memory of the present invention, an effect equal to that of the data transfer device for multidimensional memory described above can be obtained.

What is claimed is:

1. A data transfer device, comprising:

source access means for accessing a multidimensional memory, the multidimensional memory having a multidimensional memory space, the multidimensional memory space having a plurality of virtual memory elements, the plurality of virtual memory elements being laid out as a matrix;

destination access means for accessing a one-dimensional memory, the one-dimensional memory having a one-dimensional memory space;

input means for inputting a read-reference address, read area specifying information, write-reference address, and write area specifying information, the read-reference address specifying a reference point of a read area, the read area being a rectangle, the read area specifying information specifying the read area, the write-reference address specifying a reference point of a write area, the write area specifying information specifying the write area, the read area specifying information including information indicating lengths of two sides of the rectangle, one side being parallel with the row direction of the matrix, the other side being parallel with the column direction of the matrix;

multidimensional memory reading means for reading data from the multidimensional memory, the data being stored in virtual elements, the virtual elements corresponding to the read area, the read area being specified by the read-reference address and the read area specifying information, the data being read via the source access means;

one-dimensional memory writing means for writing the data in the write area of the one-dimensional memory, the write area being specified by the write-reference address and the write area specifying information, the data being written via the destination access means; and operation mode setting means for setting operation mode of the one-dimensional memory writing means to a normal transfer mode or a transposing transfer mode, wherein:

when the operation mode setting means sets the operation mode to the normal transfer mode, the one-dimensional memory writing means writes the data in the write area, the write area corresponding to a rectangular area, the rectangular area having two sides that are the same as those of the read area; and when the operation mode setting means sets the operation mode to the transposing transfer mode, the one-dimensional memory writing means writes the data in the write area, the write area corresponding to a rectangular area, the rectangular area having two sides that are interchanged with those of the read area.

2. A data transfer device, comprising:

source access means for accessing a one-dimensional memory, the one-dimensional memory having a one-dimensional memory space;

destination access means for accessing a multidimensional memory, the multidimensional memory having a multidimensional memory space, the multidimensional memory space having a plurality of virtual memory elements, the plurality of virtual memory elements being laid out as a matrix;

input means for inputting a read-reference address, read area specifying information, write-reference address, and write area specifying information, the read-reference address specifying a reference point of a read area, the read area specifying information specifying the read area, the write-reference address specifying a reference point of a write area, the write area being a rectangle, the write area specifying information specifying the write area, the write area specifying information including information indicating lengths of two sides of the rectangle, one side being parallel with the row direction of the matrix, the other side being parallel with the column direction of the matrix;

one-dimensional memory reading means for reading data from the one-dimensional memory, the read area being specified by the read-reference address and the read area specifying information, the data being read via the source access means;

multidimensional memory writing means for writing the data in the write area of the one-dimensional memory, the data being stored in virtual elements, the virtual elements corresponding to the write area, the write area being specified by the write-reference address and the write area specifying information, the data being written via the destination access means; and operation mode setting means for setting operation mode of the multidimensional memory writing means to a normal transfer mode or a transposing transfer mode, wherein:

when the operation mode setting means sets the operation mode to the normal transfer mode, the multidimensional memory writing means writes the data in the write area, the write area corresponding to a rectangular area, the rectangular area having two sides that are the same as those of the read area; and when the operation mode setting means sets the operation mode to the transposing transfer mode, the multidimensional memory writing means writes the data in the write area, the write area corresponding to a rectangular area, the rectangular area having two sides that are interchanged with those of the read area.

* * * * *